United States Patent
Shenholtz et al.

(10) Patent No.: US 6,724,371 B1
(45) Date of Patent: Apr. 20, 2004

(54) PRESENTATION BOARD DIGITIZERS

(75) Inventors: Gideon Shenholtz, Tel Aviv (IL); Itzhak Zloter, Holon (IL); Ron Serber, Tel Aviv (IL)

(73) Assignee: Pegasus Technologies Ltd., Azoor (IL)

( * ) Notice: Subject to any disclaimer, the term of this patent is extended or adjusted under 35 U.S.C. 154(b) by 0 days.

(21) Appl. No.: 09/958,316

(22) PCT Filed: Apr. 10, 2000

(86) PCT No.: PCT/IL00/00214

§ 371 (c)(1),
(2), (4) Date: Dec. 18, 2001

(87) PCT Pub. No.: WO00/62268

PCT Pub. Date: Oct. 19, 2000

(30) Foreign Application Priority Data

Apr. 14, 1999 (IL) ................................. 129450

(51) Int. Cl.$^7$ .......................... G09G 5/00; G08C 21/00
(52) U.S. Cl. ................... 345/177; 345/176; 178/18.01; 178/18.04; 178/19.01; 178/19.02
(58) Field of Search ............... 345/173, 174, 345/175, 176, 177, 179; 178/18.01, 18.03, 18.04, 18.05, 18.06, 18.07, 19.01, 19.02, 19.03, 19.04

(56) References Cited

U.S. PATENT DOCUMENTS

| | | |
|---|---|---|
| 4,506,354 A | 3/1985 | Hansen |
| 4,564,928 A | 1/1986 | Glenn et al. |
| 4,758,691 A | 7/1988 | De Bruyne |
| 4,777,329 A | 10/1988 | Mallicoat |
| 4,814,552 A | 3/1989 | Stefik et al. |
| 4,886,943 A | 12/1989 | Suzuki et al. |
| 4,910,363 A | 3/1990 | Kobayashi et al. |
| 5,073,685 A | 12/1991 | Kobayashi et al. |
| 5,097,102 A | 3/1992 | Yoshimura et al. |
| 5,308,936 A | 5/1994 | Biggs et al. |
| 6,151,014 A * | 11/2000 | Zloter et al. ............... 345/177 |
| 6,265,676 B1 * | 7/2001 | Zloter et al. ............ 178/19.01 |
| 6,300,580 B1 * | 10/2001 | Shenholz et al. ........ 178/19.02 |

FOREIGN PATENT DOCUMENTS

WO WO98/40838 9/1998

* cited by examiner

Primary Examiner—Vijay Shankar
(74) Attorney, Agent, or Firm—Mark M. Friedman

(57) ABSTRACT

A handheld device (200) includes a housing (202) having a cylindrical bore (204) therein and which terminates at a distal end (206) of the housing with a central orifice communicating therewith. The housing serves for receiving a portion of a body of a drawing implement with its drawing tip extending from the central orifice. The device (200) further includes an ultrasonic receiver or transmitter (220) mounted within the housing, remote from the drawing tip, yet in close proximity with the bore. This device serves for receiving or transmitting an intermittent ultrasound signal through the bore and the plurality of openings, thereby enabling triangulation of the drawing tip.

12 Claims, 20 Drawing Sheets

FIG. 7
(PRIOR ART)
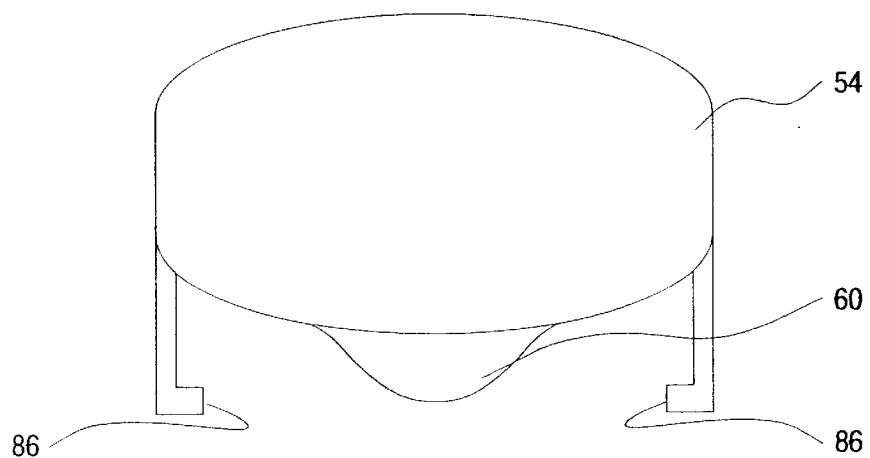
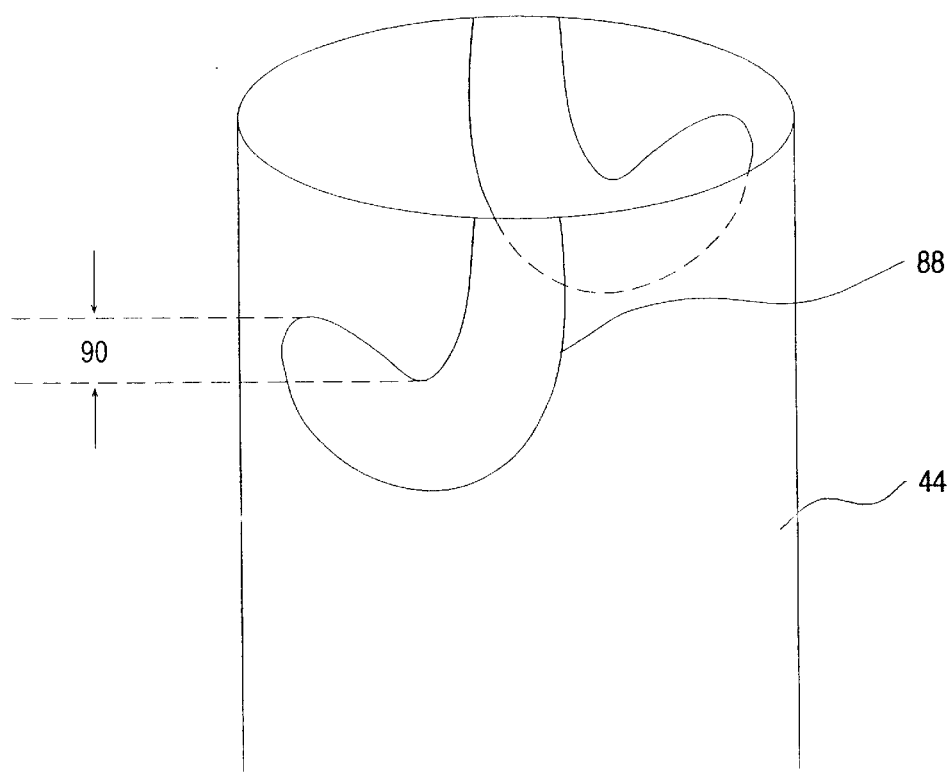

PRESENTATION BOARD DIGITIZERS

FIELD AND BACKGROUND OF THE INVENTION

The present invention relates to digitizers. More particularly, the present invention relates to devices for use with presentation boards and pens for digitizing lines drawn manually thereon.

Throughout the last decade the presentation of data in a group setting has become highly digitized, involving the use of technologically advanced audio-visual devices. As such, the use of a conventional drawing board, such as a whiteboard, in such presentations has rapidly declined.

Still, some presenters often prefer to use a marker and whiteboard to present and develop ideas during group sessions. To enable recording of information presented by such means, several digitized whiteboard systems have been developed.

Such systems typically employ a combination of transmitters and receivers for processing signals from a handheld device. The writing movements produced by these devices are traced and recorded, and as a result the textual and graphical content of a session can be digitized and ported to a computer.

Various techniques are used for determining the position of a handheld device or stylus on a flat surface. U.S. Pat. No. 4,564,928 to Glenn et al., U.S. Pat. No. 4,886,943 to Suzuki et al., U.S. Pat. Nos. 4,910,363 and 5,073,685 to Kobayashi et al. and U.S. Pat. No. 5,097,102 to Yoshimura et al. all disclose systems in which a vibrating element associated with a pen transmits vibrations through the material of a board. The vibrations are detected by transducers attached to the board and the position of the pen is calculated from the transmission time of the vibrations through the board. These systems inherently function exclusively when the pen is in contact with the board such that vibrations are transferred to the board. As a result, no special mechanism is required to distinguish writing from non-writing pen movements.

These systems are generally inaccurate due to non-uniform transmission times through the board. In fact, they typically require highly specialized board structures which renders them expensive and inconvenient.

An alternative approach is the use of air-borne ultrasound signals. Examples of such systems are described in U.S. Pat. No. 4,777,329 to Mallicoat, U.S. Pat. No. 4,814,552 to Stefik et al., U.S. Pat. No. 4,506,354 to Hansen U.S. Pat. No. 4,758,691 and to De Bruyne and PCT/IL98/00093, filed Feb. 25, 1998 by Pegasus Technologies Ltd., which is incorporated by reference as if fully set forth herein.

These systems employ various combinations of ultrasound transmitters and receivers arranged at two points fixed relative to a board and on a movable writing implement. The position of the movable implement is then derived by triangulation. These systems typically require an additional hard-wired or electromagnetic link, such as an infrared link, between the movable implement and a base unit to provide timing information for time-of-flight ultrasound calculations. An additional switch is also required to identify when the movable element is in contact with the board.

These systems are typically limited to relatively small boards. This is because of signal-to-noise ratio (SNR) limitations which interfere with obtaining accurate measurements. The volume of ultrasound used cannot be very high without causing bothersome accompanying whistling noises. Additionally, in a wireless system, power considerations severely limit the transmitted volume. In order to generate reliable position information, the transmitter-to-receiver distance must therefore be kept small. Attempts to use different sets of receivers for different regions of a large board generally result in discontinuities when the movable element travels from one region to another.

Another shortcoming of these systems is their inability to reproduce rapid interrupted pen strokes such as performed when drawing a dashed line. Typically, the transmitter or receiver element in the pen turns off when the pen is inactive and is re-activated each time the pen comes in contact with the board. The system then takes a fraction of a second to resynchronize before it responds correctly. In the case of short strokes, the length of the operative stroke may be comparable with the response time of the system, thereby giving very poor results.

An additional problem of some of the airborne ultrasound digitizer systems is that the ultrasound transmitter or receiver element is mounted asymmetrically to the side of the drawing implement or stylus. As a result, the measured position is offset from the true drawing position in a direction which changes with rotation of the drawing implement. This may result in discontinuities and illegible writing in the digitized image when the drawing implement position is changed between strokes.

Furthermore, conventional presentation board digitizer systems are typically limited to use with specially produced writing implements. This renders them expensive since pens have a very limited lifetime. Even where the ink cartridge is separately replaceable, the components used must be of a very specific design to be compatible.

Finally, styluses which employ a color writing tip are usually restricted to using a single color tip and cannot employ different colors or a tip of a different function, since the recordation system cannot distinguish between the different tips.

There is therefore a need for a reliable, low-cost, digitizer system which may be used with conventional presentation boards of all sizes for determining accurately the position of a drawing implement on the board. Additional needs and improvements provided by the present invention are described in the specification that follows.

SUMMARY OF THE INVENTION

According to one aspect of the present invention there is provided a handheld device for use with a board supplemented with a processing system for digitizing operative strokes of the handheld device on the board, the handheld device comprising (a) a housing having a substantially cylindrical bore therein terminating at a distal end of the housing with a central orifice communicating with the bore, the housing receiving a portion of a body of a drawing implement with its drawing tip extending from the central orifice, the housing being formed with a plurality of openings being circumferencly arranged at the distal end of the housing and communicating with the bore; and (b) an ultrasonic receiver or transmitter device mounted within the housing, remote from the drawing tip, yet in close proximity with the bore, the device being for receiving or transmitting an intermittent ultrasound signal through the bore and the plurality of openings, thereby enabling triangulation of the drawing tip.

According to another aspect of the present invention there is provided a handheld device for use with a board supplemented with a processing system for digitizing operative strokes of the handheld device on the board, the handheld device comprising (a) a housing having a substantially cylindrical bore therein terminating at a distal end of the housing with a central orifice communicating with the bore, the housing receiving and releasing a portion of a body of a removably attachable drawing implement through the orifice with its drawing tip extending from the central orifice; (b) a retainer in the housing for releasably retaining the removably attached drawing implement within the housing; (c) an ultrasonic receiver or transmitter device being internally or externally connected to the housing for receiving or transmitting an intermittent ultrasound signal; (d) a microswitch in the housing being actuated when contacted by a proximal end of the body, so as to be responsive to a force exerted on the drawing tip of the drawing implement; and (e) an electronic circuitry being in the housing and electronically communicating with the microswitch for affecting operation of the device at least when the microswitch indicates that the force is exerted on the drawing tip of the drawing implement.

According to yet another aspect of the present invention there is provided a handheld device for use with a board or screen supplemented with a processing system for digitizing operative strokes of the handheld device on the board or screen, the handheld device comprising (a) a housing having a substantially cylindrical bore therein terminating at a distal end of the housing with a central orifice communicating with the bore, the housing receiving and releasing a portion of a body of a removably attachable operative implement through the orifice with its operative tip extending from the central orifice, the operative implement being selected from the group consisting of a drawing implement and an annotation implement; (b) a retainer in the housing for releasably retaining the removably attached operative implement within the housing; and (c) an ultrasonic receiver or transmitter device being externally or internally connected to the housing for receiving or transmitting an intermittent ultrasound signal.

According to still another aspect of the present invention, in a board or screen digitizing system including at least three spaced apart ultrasound receivers associated with the board or screen surface, and a handheld device including an intermittent signal transmitter, there is provided a method of tracking the handheld device, the signals being transmitted with a preset first interval therebetween, the method comprising the steps of collecting a plurality of time non-referenced ultrasound signals by each of the at least three spaced apart ultrasound receivers and calculating a position of the handheld device for each of the time non-referenced ultrasound signals, thereby tracking the handheld device. Preferably, reception of each of the at least three spaced apart ultrasound receivers is suspended for a second time interval following the reception of a signal thereby, the second time interval is shorter than the first time interval.

According to an additional aspect of the present invention there is provided a handheld device for use with a board or screen supplemented with a processing system for digitizing operative strokes of the handheld device on the board or screen, the handheld device comprising (a) a housing having a substantially cylindrical bore therein terminating at a distal end of the housing with a central orifice communicating with the bore, the housing receiving and releasing a portion of a body of a removably attachable operative implement through the orifice with its operative tip extending from the central orifice and being selectable among a plurality of different operative implements; (b) a retainer in the housing for releasably retaining the removably attached operative implement within the housing; and (c) an ultrasonic transmitter device being internally or externally connected to the housing for transmitting one of a plurality of intermittent ultrasound signals, each of the plurality of intermittent ultrasound signals having a different frequency, each of the frequencies being associated with one of the plurality of different operative implements; and (d) a controller on or in the housing for setting the transmitter device to transmit an intermittent ultrasound signal of a frequency corroborating with one of the plurality of different operative implements.

According to a still additional aspect of the present invention there is provided a handheld device for use with a board or screen supplemented with a processing system for digitizing operative strokes of the handheld device on the board or screen, the handheld device comprising (a) a housing having a substantially cylindrical bore therein terminating at a distal end of the housing with a central orifice communicating with the bore, the housing receiving a portion of a body of an operative implement with its operative tip extending from the central orifice; (b) an ultrasonic transmitter device being internally or externally connected to the housing for transmitting one of two intermittent ultrasound signals, each of the two intermittent ultrasound signals having a different frequency; (c) a microswitch in the housing being in a first mode or a second mode, the microswitch being in the first mode when in contact with a proximal end of the body and in the second mode when not in contact with the proximal end of the body; and (d) an electronic circuitry electronically communicating between the microswitch and the transmitter device, the electronic circuitry being for associating one of the first and second modes with the transmitter device, such that the intermittent ultrasound signals of the different frequency are transmitted by the transmitting device in a mode dependent manner, thereby informing the processing system whether the operative tip is in contact with, or removed from, the board or screen.

According to a yet additional aspect of the present invention there is provided a handheld device for use with a board or screen supplemented with a processing system for digitizing operative strokes of the handheld device on the board or screen, the handheld device comprising (a) a housing having a substantially cylindrical bore therein terminating at a distal end of the housing with a central orifice communicating with the bore, the housing receiving a portion of a body of an operative implement with its operative tip extending from the central orifice, at least a longitudinal portion of the housing originating at the distal end of the housing being of an infrared conveying material; (b) an ultrasonic receiver or transmitter device being internally or externally connected to the housing for receiving or transmitting an intermittent ultrasound signal; (c) an infrared transmitter device being implemented at a proximal end of the longitudinal portion of the housing, the infrared transmitter device being designed for directing infrared radiation emitted thereby through the longitudinal portion of the housing.

According to further features in preferred embodiments of the invention described below, the longitudinal portion of the housing is supplemented with an infrared reflector for reflecting the infrared radiation out of the housing.

According to a further aspect of the present invention there is provided a handheld device for use with a board or screen supplemented with a processing system for digitizing operative strokes of the handheld device on the board or screen, the handheld device comprising (a) a housing having a substantially cylindrical bore therein terminating at a distal end of the housing with a central orifice communicating with the bore, the housing receiving a portion of a body of an operative implement with its operative tip extending from the central orifice; (b) an ultrasonic receiver or transmitter device being internally or externally connected to the housing for receiving or transmitting an intermittent ultrasound signal; (c) a pressure sensitive microswitch in the housing being actuated when pressured by a proximal end of the body, so as to be responsive to a force exerted on the drawing tip of the drawing implement; and (d) an electronic circuitry being in the housing and electronically communicating with the microswitch for affecting operation of the device at least when the microswitch indicates that the force is exerted on the drawing tip of the drawing implement.

According to a still further aspect of the present invention there is provided a remotely controlled handheld device for use with a board or screen supplemented with a processing system for digitizing operative strokes of the handheld device on the board or screen, the handheld device comprising (a) a housing having a substantially cylindrical bore therein terminating at a distal end of the housing with a central orifice communicating with the bore, the housing receiving a portion of a body of an operative implement with its operative tip extending from the central orifice; (b) an ultrasonic receiver or transmitter device being internally or externally connected to the housing for receiving or transmitting an intermittent ultrasound signal; and (c) a remote signal receiver for receiving operational command signals from a remote signal transmitter being controlled by an operator.

According to yet a further aspect of the present invention there is provided a handheld device for use with a board or screen supplemented with a processing system for digitizing operative strokes of the handheld device on the board or screen, the handheld device comprising (a) a housing having a substantially cylindrical bore therein terminating at a distal end of the housing with a central orifice communicating with the bore, the housing receiving a portion of a body of an operative implement with its operative tip extending from the central orifice; and (b) a transparent ultrasonic receiver or transmitter device being connected to the housing and surrounding the operative tip for receiving or transmitting an intermittent ultrasound signal, thereby rendering the operative tip visible to a user.

The present invention successfully addresses the shortcomings of the presently known configurations by providing a plurality of improvements to handheld devices for use with a board or screen supplemented with a processing system for digitizing operative strokes of the handheld devices, which improvements are further addressed in the following sections of the specification.

BRIEF DESCRIPTION OF THE DRAWINGS

The invention is herein described, by way of example only, with reference to the accompanying drawings, wherein:

FIG. 7 is a schematic perspective view of a prior art structure for attachment of a retaining member to a housing for use in the transmitter device of FIG. 5;

DESCRIPTION OF THE PREFERRED EMBODIMENTS

The present invention is of a handheld device employable with a board or screen supplemented with a processing system, which can be used for digitizing operative strokes of the handheld device on the board or screen. Specifically, the present invention can be used for digitizing graphical or textual data drawn on the face of a presentation board and for digitizing annotations with relation to a screen, such as a computer screen.

For purposes of better understanding the present invention, as illustrated in FIGS. 14–21 of the drawings, reference is first made to the construction and operation of a conventional (i.e., prior art) handheld device as illustrated in FIGS. 1–13 which are reproduced from PCT/IL98/00093.

Figure 1:
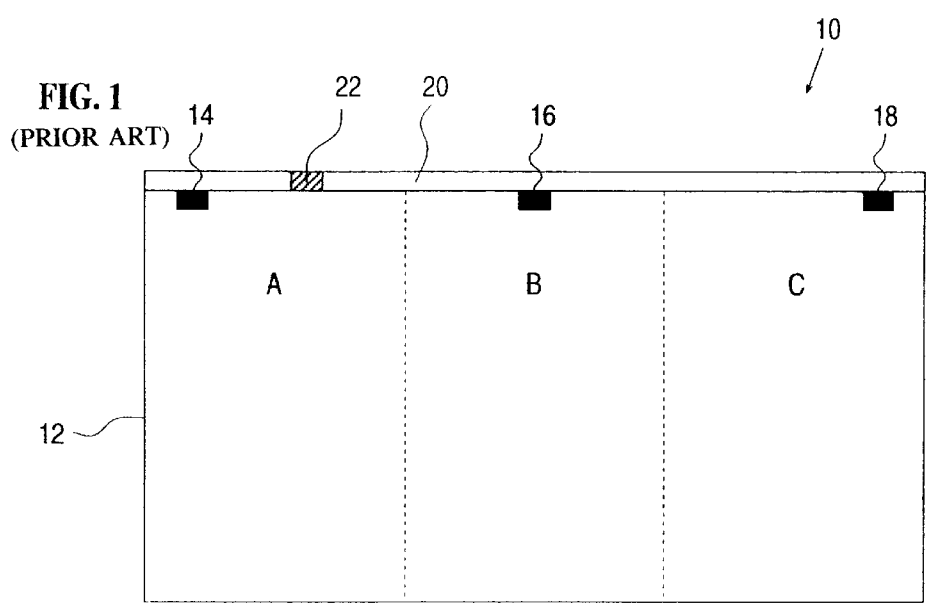
FIG. 1 is a schematic front view of a prior art presentation board provided with a digitizer system, showing a switchover zone between regions with different groups of ultrasound receivers.

FIG. 1 shows a presentation board digitizer system, generally designated 10, constructed and operative according to the teachings of the prior art, showing a switch-over zone between regions with different groups of ultrasound receivers.

Generally speaking, system 10 features a presentation board 12, which may be of any conventional type, provided with a plurality of ultrasound receiver assemblies 14, 16 and 18. Ultrasound receiver assemblies 14, 16 and 18 are preferably mounted in a strip 20 adapted for convenient attachment to presentation boards of differing sizes and thicknesses. This attachment may be achieved through clamps or clips of any type. Strip 20 also features an infrared (IR) receiver 22. A cover (not shown) is preferably provided for shielding ultrasound receiver assemblies 14, 16 and 18 and IR receiver 22 from sound and radiation originating away from board 12. System 10 operates with a movable element having both ultrasound and infrared transmitters, an example of which will be described in detail below. The present position of the movable element is derived from the time-of-flight (TOF) of ultrasound signals from the movable element to the receiver assemblies by triangulation. The IR signal provides synchronization information, as well as carrying additional information such as, for example, the color of a pen being used.

In principle, two ultrasound receivers are sufficient to uniquely determine the position of a movable element in contact with board 12. However, in order to provide reliable ultrasound reception over the entire area of a large-board, system 10 employs more than one set of receivers. Thus, in the system as illustrated, a first set of receivers is defined as the pair of ultrasound receiver assemblies 14 and 16, and a second set of receivers is defined as the pair of ultrasound receiver assemblies 16 and 18. Clearly, the first set of ultrasound receivers so defined is well positioned for receiving an ultrasound signal from the transmitter when the movable element is in a first region denoted A, and the second set of ultrasound receivers is well positioned for receiving the signal when the movable element is in a second region denoted C. Thus, optimal precision and reliability is achieved by deriving the position of the movable element from the outputs of ultrasound receiver assemblies 14 and 16 when the movable element is in region A, and from the outputs of ultrasound receiver assemblies 16 and 18 when the movable element is in region C.

In order to avoid possible discontinuities in the tracking of the position of the movable element as it traverses board 12, some configurations provide a switch-over zone, denoted B, between regions A and C. Within switch-over zone B, the current position of the movable element is derived based on a weighted function of the positions calculated from the outputs of the first and second sets of receivers. The weighted function varies smoothly with position across switch-over zone B such that it approaches the value calculated from the first set of receivers when the movable element borders first region A and approaches the value calculated from the second set of receivers when the movable element borders the second region.

Figure 2:
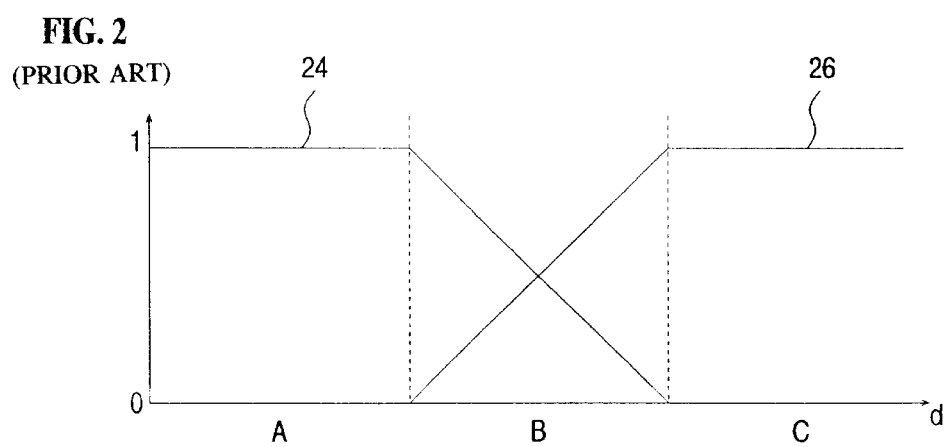
FIG. 2 is a plot illustrating the variation of relative weighting of position indications from two sets of ultrasound receivers in FIG. 1 as a function of position across the presentation board (prior art)

FIG. 2 shows a typical variation of the weighting function with distance across board 12. Here, plot 24 corresponds to the weighting factor applied to the first group of ultrasound receivers, and plot 26 corresponds to the weighting factor applied to the second group of ultrasound receivers. In this example, the variation within switch-over zone B is shown as linear. However, other, more complex functions may be used as desired. Within region A, plot 24 is constant at 1 and plot 26 is zero, whereas within region B, these values are reversed.

It should be noted that calculation of the current position of the movable element according to the system described requires calculation of weighting factors which are themselves a function of position. This apparent circularity of calculation may be circumvented in a number of ways. Most simply, since the position is measured repeatedly at short intervals, it is reasonable to assume that the new current position is a relatively small distance from the previously measured position. It is therefore reasonable to employ the last measured position for calculating the weighting factors for the subsequent measurement. Alternatively, or for the purposes of making an initial measurement, an approximate measurement may be made with some arbitrary weighting factor such as, for example, 0.5 for each set.

In addition to the switch-over zone algorithm, it is preferable that the ultrasound receivers are located sufficiently close to provide some degree of redundancy of measurement. This redundancy can then be employed (typically independent of the switch-over zone considerations) to provide a self test for accuracy and to identify any erroneous measurements which may occur temporarily.

Specifically, if receivers 14, 16 and 18 are collinear with equal spacing A, and the distance from each receiver as measured by TOF calculations is $s_1$, $s_2$ and $s_3$, respectively, simple trigonometry dictates that:

$$s_1^2 - 2s_2^2 + s_3^2 = 2A^2 \text{ (constant)}$$

By calculating this sum whenever three simultaneous TOF measurements are available, the system can continuously test that it is functioning within an acceptable margin of accuracy. In a case that a significant error is found, further statistically based self-analysis algorithms may be implemented to identify which receiver produced the erroneous reading and to temporarily exclude that receiver from position calculations.

Figure 3:
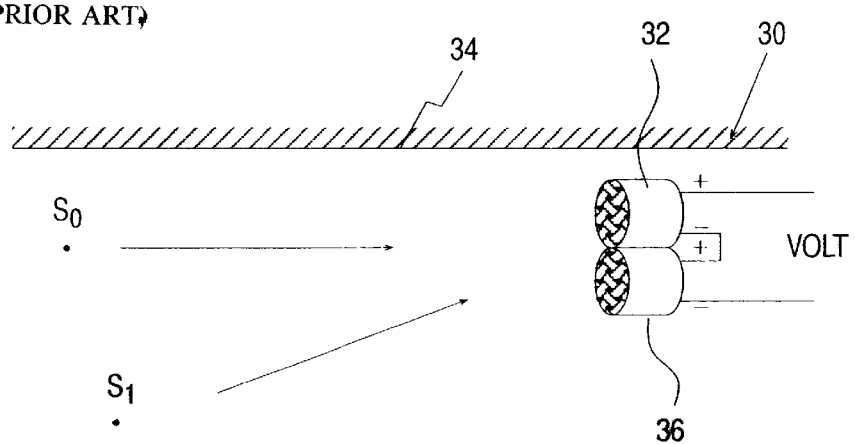
FIG. 3 is a side view of a twin ultrasound receiver assembly for use in a presentation board digitizer system (prior art)
Figure 4:
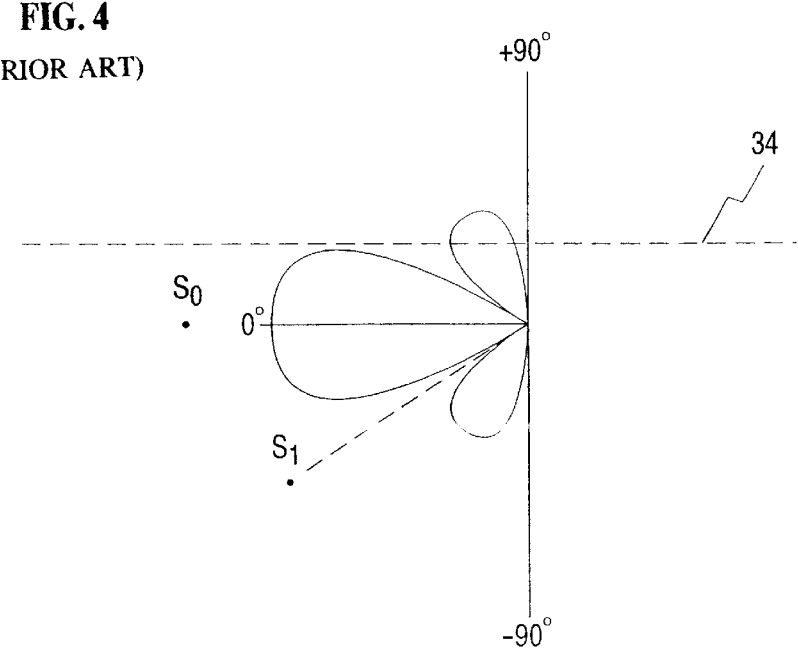
FIG. 4 is a schematic representation of the reception characteristic of the twin ultrasound receiver assembly of FIG. 3.

Turning now to FIGS. 3 and 4, a design of an ultrasound receiver assembly, generally designated 30, for use with presentation board digitizer systems will now be described.

Generally speaking, ultrasound receiver assembly 30 includes a first ultrasound receiver 32 located adjacent to the surface 34 of the presentation board, and a second ultrasound receiver 36 displaced from first ultrasound receiver 32 in a direction substantially perpendicular to surface 34.

First and second ultrasound receivers 32 and 36 are connected so as to generate a total output signal corresponding to the instantaneous sum of the amplitudes of ultrasound signals which they receive. Typically, for simple transducers, this is achieved by connecting them in series such that their output voltages are additive.

FIG. 4 shows a plot in polar coordinates of the variation of sensitivity of assembly 30 with angle of incidence in a plane perpendicular to the surface 34. The phase differences between ultrasonic vibrations reaching the two receivers, when added, result in pronounced variation of the sensitivity of assembly 30 with angle of incidence, as shown. Specifically, the maximum sensitivity of assembly 30 occurs in a plane central to the main lobe of FIG. 4 corresponding to a plane of symmetry between receivers 32 and 36. Signals arriving at the two receivers which are incident from this plane necessarily have zero path and phase difference, thereby producing a maximum amplitude output signal. Reception from the n=1 side lobes is preferably minimized by use of a cover element (not shown) which shields assembly 30 from sound incident at large angles from surface 34.

By arranging assembly 30 as described, the plane of maximum sensitivity is oriented substantially parallel and adjacent to surface 34. This is ideal for receiving signals incident from near the presentation board ($S_2$). Conversely, assembly 30 exhibits greatly reduced sensitivity to signals ($S_1$) incident from further away from the presentation board. These directional properties greatly help to isolate the ultrasound signals of importance to the digitizer system, increasing the signal-to-noise ratio. This allows the use of lower transmitter intensities and/or larger boards, and solves problems caused by a wide range of common noise sources. It should be noted that the sensitivity profile of assembly 30 parallel to surface 34 remains substantially omnidirectional similar to the profile of an individual receiver.

Figure 5:
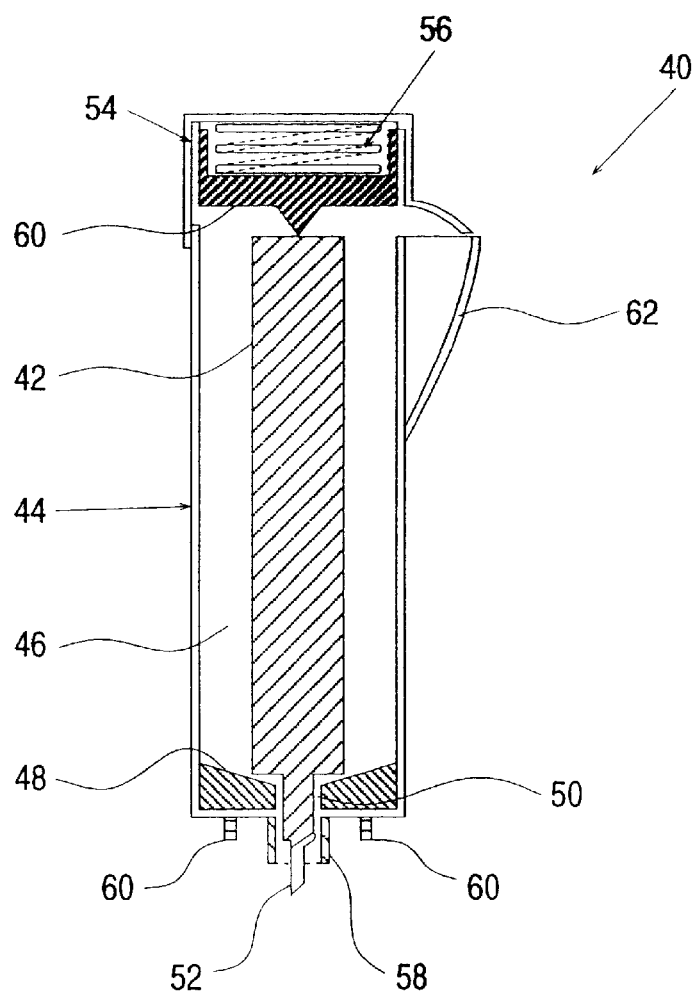
FIG. 5 is a side cross-sectional view of a prior art transmitter device used with a conventional drawing implement in a digitizer system.

Turning now to FIGS. 5–7, a transmitter device, generally designated 40, for use with a drawing implement 42 in a digitizer system will be described.

Generally speaking, transmitter device 40 includes a housing 44 having a substantially cylindrical opening 46 which terminates at its lower end in an annular wedge surface 48 having a central bore 50. Drawing implement 42 is received within opening 46 with its operative tip 52 extending through bore 50.

Transmitter device 40 also includes a retainer 54 in the form of a cover attachable to the upper end of opening 46 to retain drawing implement 42 in position within housing 44. Retainer 54 features a spring element 56 for biasing drawing implement 42 towards annular wedge surface 48. An ultrasound transmitter 58 is mounted on the lower surface of housing 44 proximal to bore 50. Spring element 56 is preferably provided with a shaped abutment surface 60 having features for centering the back end of a drawing implement. Typically, abutment surface 60 has an axial conical projection as shown for centering drawing implements by engaging a rear axial recess which is common to almost all presentation board pens. Alternatively, abutment surface 60 may be formed with a conical recess or other features for centering the back of a drawing implement.

It should be noted that the combination of annular wedge surface 48 and spring element 56 with abutment surface 60 serves to hold drawing implements of a range of lengths and widths in central alignment within cylindrical opening 46 without contacting the sides of housing 44. This arrangement makes transmitter device 40 insensitive to variations in drawing implement width. The avoidance of frictional contact with the sides of housing 44 is also important for efficient operation of a contact-sensing microswitch, as will be described below.

Ultrasound transmitter 58 is formed as a substantially cylindrical piezoelectric transmitter element attached to the lower end of housing 44 around central bore 50. This arrangement ensures that, when in use, the cylindrical transmitter is coaxial with drawing implement 42, circumscribing a part of drawing implement 42 proximal to operative tip 52. As a result of the symmetry of this arrangement, TOF measurements of the position of drawing implement 42 are completely independent of axial rotation of transmitter device 40. Furthermore, the position of operative tip 52 can be determined very precisely by adding the radial dimension of transmitter cylinder 58 to the value calculated from the TOF.

Transmitter device 40 also typically features at least one element of an electromagnetic communications link, typically an IR transmitter 60, and preferably about four such transmitters spaced around the lower end of housing 44. This ensures that at least one IR transmitter will be correctly oriented facing an IR receiver mounted on the presentation board at any time. It should be noted that a reversed arrangement in which an IR link is formed with a board-mounted transmitter and device 40 is also applicable. The IR link may be dispensed with entirely if three ultrasound receivers are used to calculate each position. However, the arrangement described is preferred for providing higher precision than a purely ultrasound-based system whilst avoiding the need for complex IR signal processing circuitry in the transmitter device. Additionally, the IR transmitter allows transmission of extra information such as pen color and the like.

Ultrasound transmitter 58 and IR transmitters 60 are actuated under the control of electronic circuitry which is battery powered. Both the electronic circuitry and the battery are located in a compartment 62 of housing 44.

Transmitter device 40 features a switch for detecting contact between operative tip 52 and the surface of a writing board. This switch is associated with the electronic circuitry and is employed to actuate ultrasound transmitter 58 and IR transmitters 60. The switch is formed as a microswitch positioned to respond to changes in the force applied by drawing implement 42 against annular wedge surface 48.

Figure 6A:
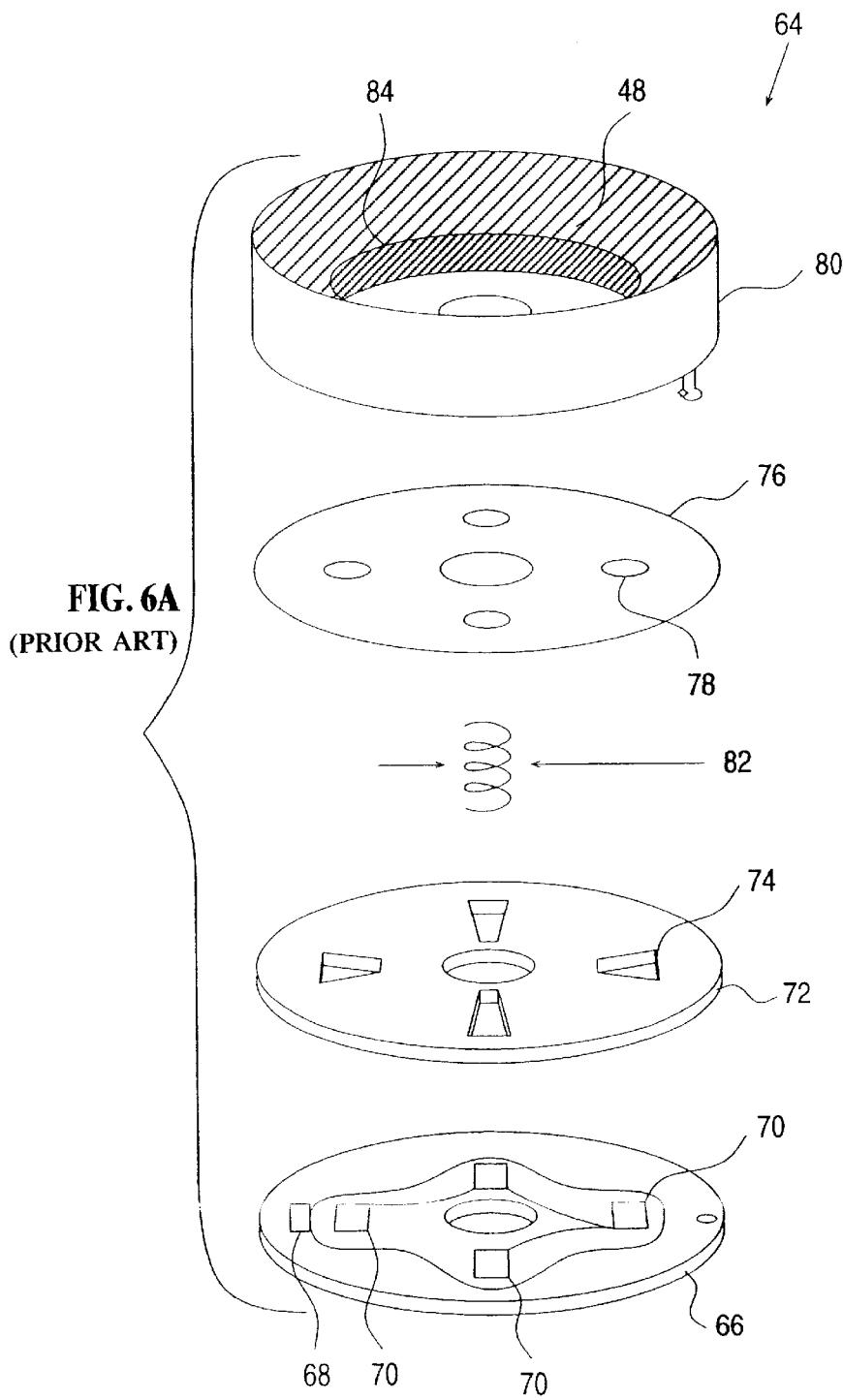
FIG. 6A is an exploded perspective view of a prior art microswitch structure for use in the transmitter device of FIG. 5 (prior art)
Figure 6B:
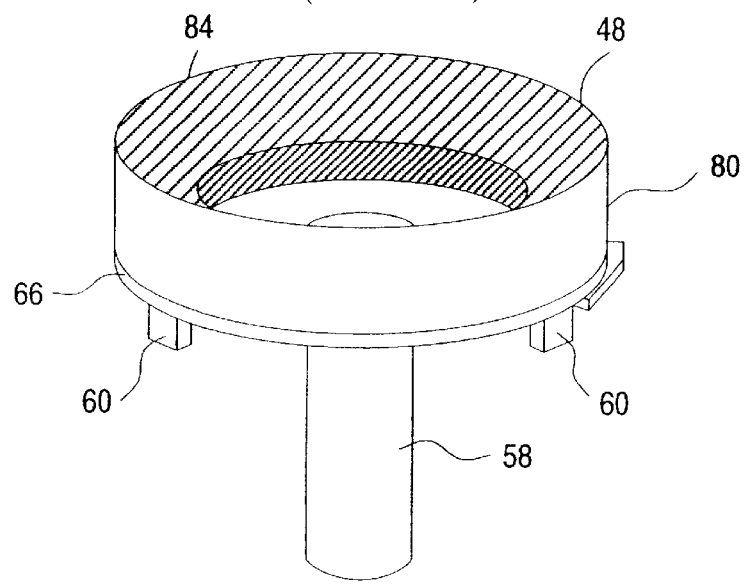
FIG. 6B is a perspective view of the microswitch structure of FIG. 6A assembled (prior art)
Figure 6C:
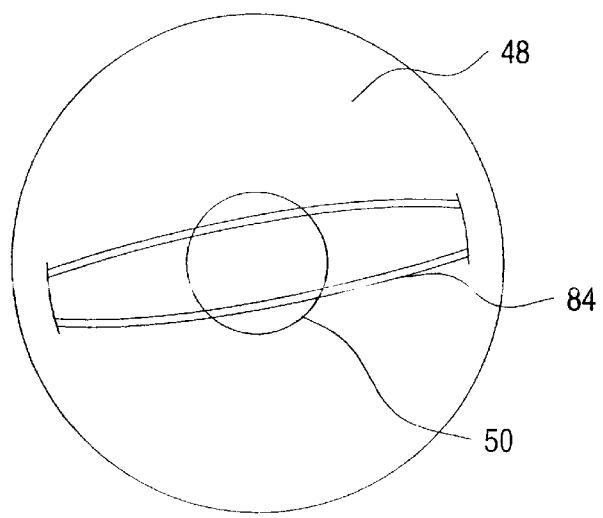
FIG. 6C is a top view of the microswitch structure of FIG. 6A showing a retaining spring arrangement (prior art)
Figure 8:
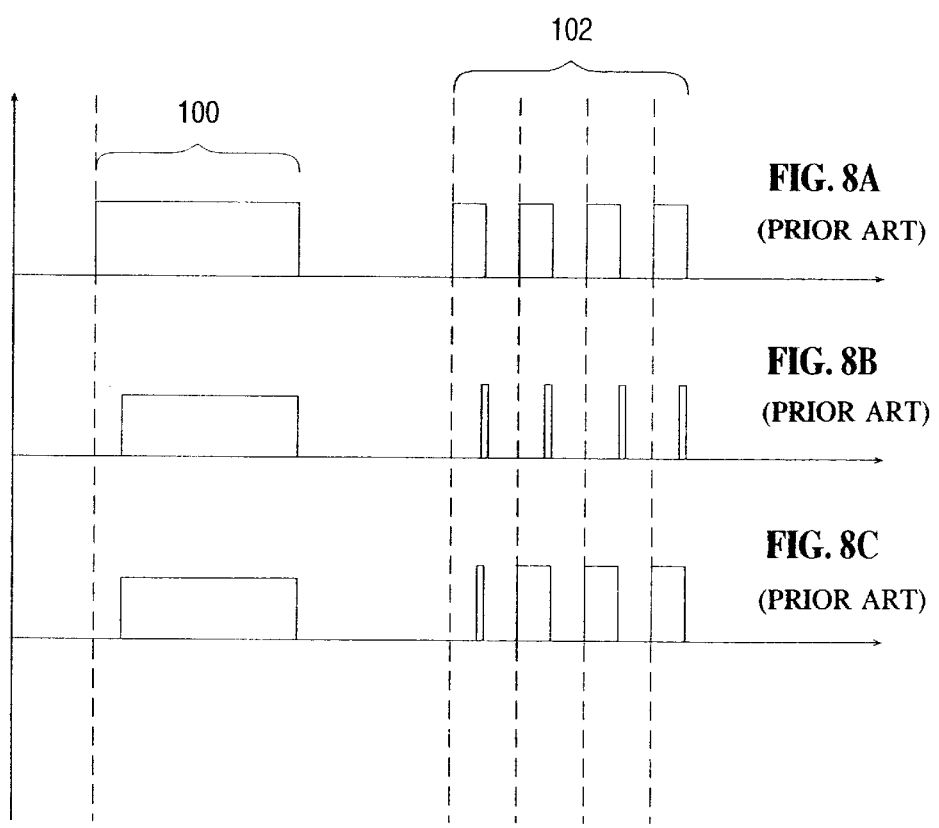
FIG. 8A is a plot of the output of a contact switch activated by operational contact between a drawing implement and a presentation board as a function of time (prior art)
FIG. 8B illustrates the recorded drawing implement operation time profile produced by inferior prior art systems corresponding to the contact profile of FIG. 5A.
FIG. 8C illustrates the corresponding recorded drawing implement operation time profile produced according to one embodiment of a prior art presentation board digitizer system.

FIGS. 6A–6C show a construction for such a microswitch, generally designated 64. Microswitch 64 is formed from three functional layers. First, a base layer 66 provides the two terminals of the microswitch, a single peripheral contact 68 and a set of common contacts 70, spaced-apart around the center of base layer 66. On top of base layer 66 lies a layer of conductive resilient foam 72 having cut-out holes 74 opposite contacts 70. A third rigid conducting layer 76 lies above foam layer 72. Conducting layer 76 has small conductive downward projections 78 aligned with holes 74. An upper cover 80, integrally formed with annular wedge surface 48, attaches loosely to base layer 66 to unify the structure while allowing sufficient vertical motion for operation of the switch. Each layer has a central bore, together corresponding to bore 50 of FIG. 5.

In a non-compressed state, conductive contact is made between peripheral contact 68 and foam layer 72 and between foam layer 72 and upper conducting layer 76.

However, the switch remains open since the thickness of foam layer 72 prevents contact between projections 78 and inner contacts 70. When pressure is applied to compress microswitch 64, foam layer 72 becomes compressed until projections 78 come into contact with inner contacts 70, thereby closing the switch. In principle, release of the pressure allows the foam layer to return to its initial state, thereby breaking the circuit. However, in practice, the relaxation response time of the foam material is typically quite slow. For this reason, a spring 82 is mounted between base layer 66 and upper conductive layer 76 such that, when the pressure is released, upper conductive layer 76 is lifted immediately so as to break the circuit.

It will be clear that, when drawing implement 42 is not in use, spring element 56 urges drawing implement 42 downwards against annular wedge surface 48 so as to close microswitch 64. When drawing implement 42 is used to draw on a presentation board, a force is exerted on operative tip 52 of drawing implement 42 towards housing 44, causing drawing implement 44 to recoil slightly against spring element 56. This reduces the pressure exerted on annular wedge surface 48 the circuit of microswitch 64 opens. The electronic circuitry of transmitter device 40 is responsive at least to opening of microswitch 64 to affect a signal transmitted by transmitter device 40.

FIG. 6B shows microswitch 64 assembled, together with ultrasound transmitter 58 and IR transmitters 60. FIG. 6C shows a pair of spring elements 84 which are mounted within annular wedge surface 48 so as to grip the end of a drawing implement inserted through central bore 50. This ensures that the upper layer of microswitch 64 is sensitive to movements of drawing element 42.

With regard to microswitch 64, it should be noted that correct operation of the switch depends on a degree of freedom of axial motion of drawing implement 42 against spring element 56. For this reason, it is important that spring element 56 is not fully compressed when retainer 54 is attached.

FIG. 7 shows an example of a structure for attachment of retainer 54 to housing 44, in which lateral projections 86 engage channels 88 which are shaped to provide a margin of release 90 when fully engaged. Margin of release 90 is designed to be at least sufficient to allow an operative range of motion of microswitch 64.

Figure 11:
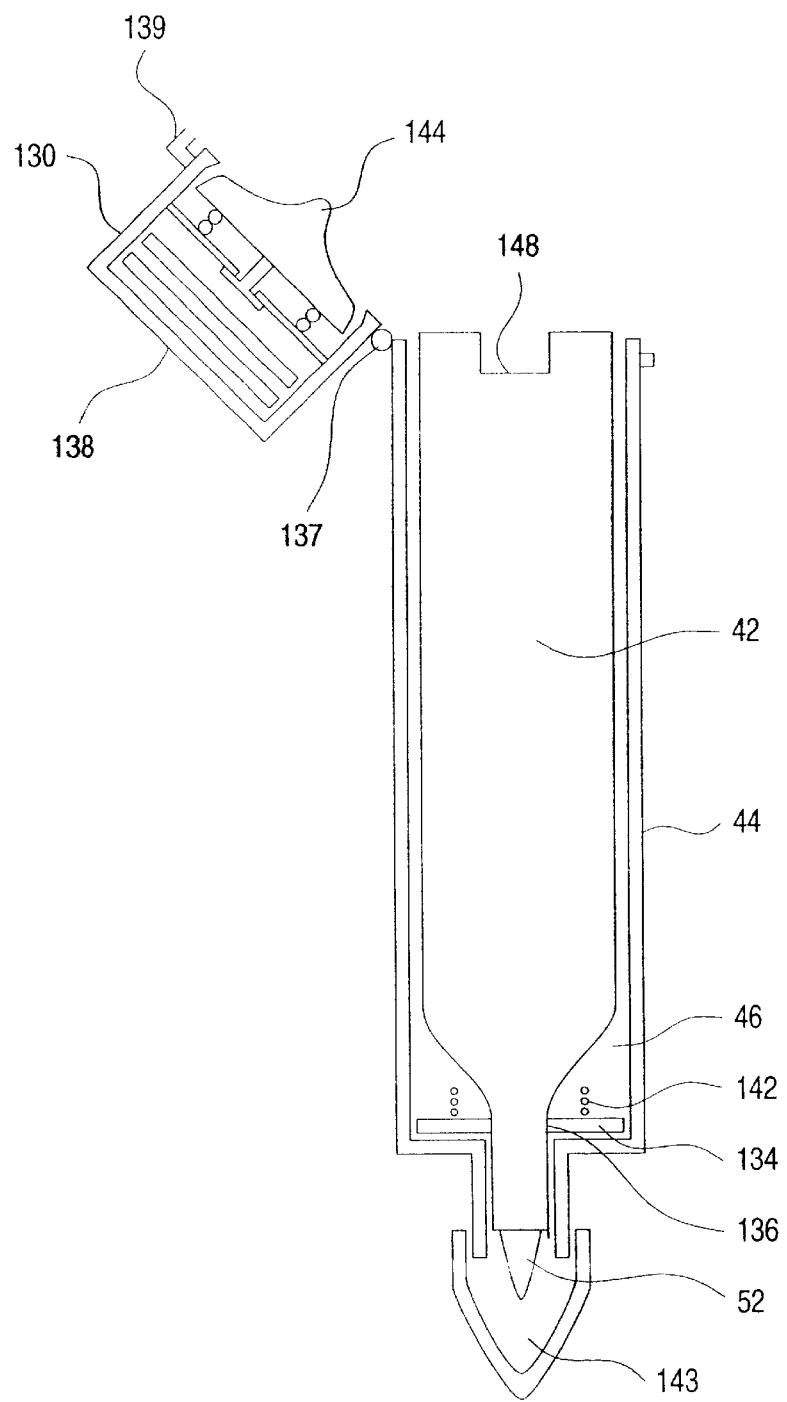
FIG. 11 shows a second embodiment of the transmitting device (prior art)

A second option for transmitter device 40 is shown in FIG. 11. Similarly to the configuration shown in FIG. 5, device 40 is intended for use with drawing implement 42. Transmitter device 40 also features housing 44 with cylindrical opening 46. However, cylindrical opening 46 now terminates at its lower end with a gasket 134. Gasket 134 features a central bore 136, through which operative tip 52 of drawing implement 42 extends.

In place of retainer 54, transmitter device 40 features a different type of retainer, which is a holder 138. Holder 138 is hingedly attached to the upper end of housing 44 with a hinge 137, and acts to hold drawing implement 42 substantially centered within opening 46. Holder 138 locks onto housing 44 by a locking pin 139. Holder 138 features a spring element 140 for biasing drawing implement 42 towards gasket 134. A second spring element 142, located near gasket 134, helps further bias and center drawing implement 42 within opening 46. Spring element 140 is stronger than second spring element 142. A cover 143 is also provided for drawing implement 42.

Figure 12A:
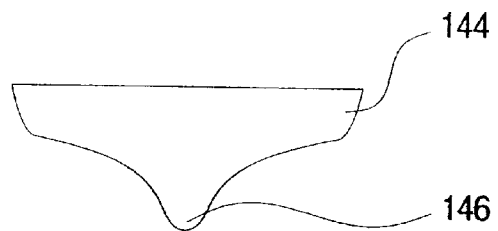
FIGS. 12A and 12B show two different forms of the upper biasing element (prior art)
Figure 12B:
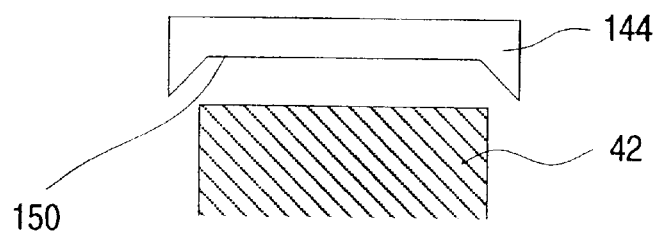

In order to retain drawing implement 42 in the centered position, holder 138 has an upper biasing element 144. Upper biasing element 144 can be in one of two shapes, as shown in FIGS. 12A and 12B. FIG. 12A shows upper biasing element 144 with an axial conical projection 146 for centering drawing implement 42 by engaging a rear axial recess 148 which is common to most presentation board pens. However, this embodiment is potentially restricted to use only with presentation board pens having axial recess 148 with a particular diameter, as axial recess 148 is not of uniform diameter between pens. Alternatively and preferably, upper biasing element 144 features a recess 150 into which the upper end of drawing implement 42 is inserted, as shown in FIG. 12B. This second configuration has the advantage of being usable with most presentation board pens, since the external diameter of these pens is generally uniform.

The combination of upper biasing element 144, gasket 134 and spring elements 140 and 142 has the advantage of holding drawing implements of a variety of lengths and external diameters in central alignment within cylindrical opening 46 substantially without contacting the sides of housing 44. As described above for FIG. 5, the avoidance of frictional contact with the sides of housing 44 is also important for efficient operation of a contact-sensing microswitch 152.

Holder 138 also has a pressure-sensitive element 152, which has two parts, a pin 154 and a printed circuit board 156. Pin 154 contacts upper biasing element 144, sensing when contact is made between drawing implement 42 and the presentation board. In combination, these two parts allow transmitting device 40 to sense when contact has been made with the presentation board.

Transmitting device 40 also features ultrasound transmitter 58 and IR transmitter 60, similar to the configuration shown in FIG. 5. Ultrasound transmitter 58 and IR transmitters 60 are actuated under the control of electronic circuitry 158 which is preferably battery powered by a battery 160. Both electronic circuitry 158 and battery 160 are located in holder 138 of housing 44.

Turning to FIGS. 8A–8C, a transmission profile of transmitter device 40 will now be described. FIG. 8A represents a contact profile of drawing element 42 as measured by microswitch 64 as a function of time. During a first period 100, drawing implement 42 is kept in contact with the presentation board for an extended period to draw a continuous shape. Then, during a second period 102, drawing implement 42 is used in a series of short, separate strokes to form a dashed line.

As mentioned above, some digitizer systems suffer from a significant delay in picking-up the beginning of each pen stroke. This is because the transmitters are actuated each time pen contact is made and interrupted each time pen contact ceases. As a result, each pen stroke starts with a dead time during which the receiver system synchronizes and locks on to the transmitted signals. The results of this system are shown in FIG. 8B. During period 100 the effects are not very serious. There is a small signal loss at the beginning of the period, but the great majority of the stroke is recorded well. During period 102, however, the system response time is comparable to the length of the pen strokes. As a result, the dashed line is almost completely lost.

To solve this problem, synchronization is maintained between transmitter device 40 and the receiver system for a given period after the end of each pen stroke. Typically, this is achieved by the electronic circuitry continuing to operate IR transmitters 60 for the given time interval after microswitch 64 ceases to indicate a force exerted on the outer housing towards the operative tip of the drawing implement. False drawing signals can be avoided either by the electronic circuitry disabling ultrasound transmitter 58 during the delay period, or by changing the content of the IR signal to indicate a non-contact pen state.

FIG. 8C illustrates the response profile of transmitter device 40 as described. During an initial period of a single pen stroke, its response is not dissimilar from that of less comprehensive devices. However, when short repeated strokes are encountered, transmitter device 40 maintains synchronization between successive strokes, thereby providing an accurate response immediately on switching of microswitch 64.

Figure 9:
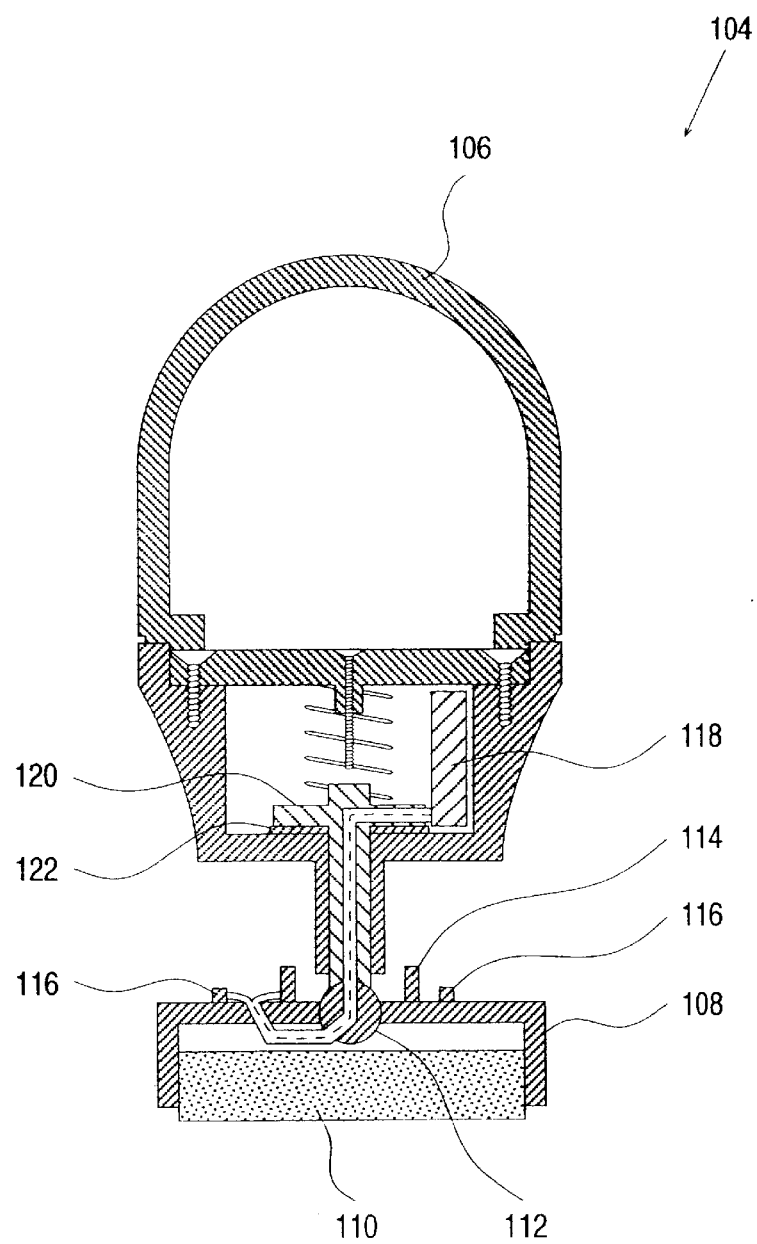
FIG. 9 is a side cross-sectional view of a prior art eraser transmitter unit for use with a digitizer system.

Turning now to FIG. 9, an eraser, generally designated 104, for use with a presentation board digitizer system will be described. A major problem with eraser elements for use with digitizer systems is the common practice of employing only a part of the eraser surface. Since the digitizer is typically unable to distinguish between flat contact and edge contact of the eraser, the digitized image frequently shows a much greater erased area than has actually been cleared from the presentation board itself. To solve this problem, eraser 104 is constructed such that its eraser surface is self-orienting to lie parallel to the presentation board surface. This ensures that the contact area of the eraser element is always precisely defined.

Thus, eraser 104 has a handle 106 and an eraser element 108 which has a substantially flat, eraser surface 110. Handle 106 and eraser element 108 are connected by a pivot joint 112, typically in the form of a ball-and-socket, which has two degrees of rotational freedom. The use of pivot joint 112 ensures that, in use, eraser element 108 assumes an orientation with eraser surface 110 parallel to the presentation board surface substantially independent of the orientation at which handle 106 is held.

Eraser 104 also features transmitter device features analogous to those of transmitter device 40 described above. These include a cylindrical ultrasound transmitter element 114, a number of IR transmitters 116 and an electronic circuitry/battery block 118. Connection of handle 106 to pivot joint 112 is through a sprung pin assembly 120. A pressure sensing microswitch 122 is mounted in the seat of pin assembly 120 for sensing contact pressure between handle 106 and eraser element 108. Wiring from electronic circuitry 118 to transmitters 114 and 116 is preferably located axially within pin assembly 120 and passing through pivot joint 112.

Eraser surface 110 is circular, and cylindrical ultrasound transmitter element 114 is arranged such that its axis is aligned with the center of eraser surface 110. By addition of the radius of the cylinder to the TOF measurements, this arrangement allows precise identification of the center of the circle of erasure, and hence of the entire area covered by eraser surface 110. Eraser 104 thus provides a much higher degree of precision and determination of the erased area than can be achieved by other prior art devices.

Figure 13:
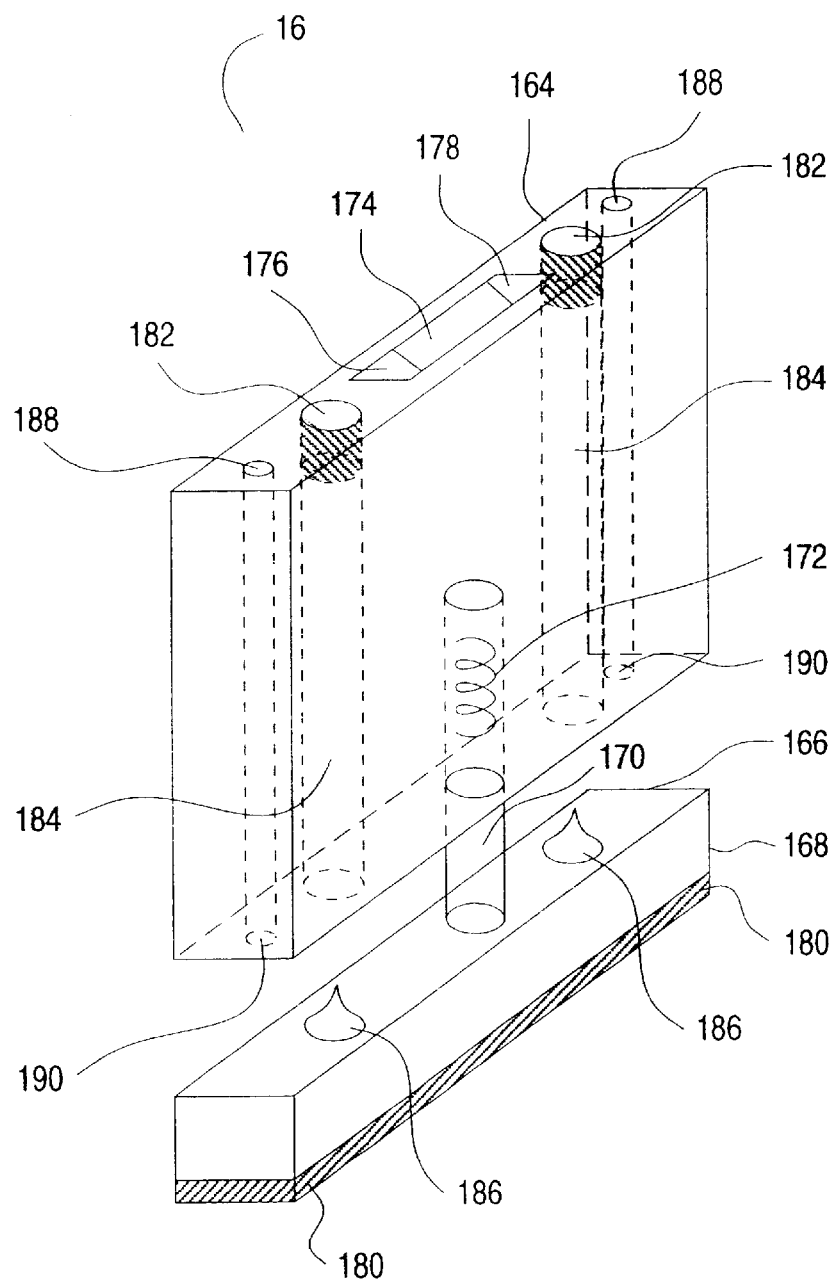
FIG. 13 shows a second embodiment of a prior art eraser.

A second embodiment of an eraser 162 is shown in FIG. 13. Eraser 162 is designed for erasing a small area, particularly an area of narrow width, and can thus be described as a "narrow-band eraser". Similarly to eraser 104, eraser 162 has a handle 164 and an eraser element 166 which has a substantially flat eraser surface 168. However, handle 164 is connected to eraser element 166 by a pressure-sensitive element 170. Pressure-sensitive element 170 includes a spring 172, such that when at least a portion of eraser surface 168 contacts the presentation board, a signal is transmitted to a touch switch 174. Touch switch 174 includes a printed circuit board 176 and electrical circuitry 178, which enable touch switch 174 to identify when eraser surface 168 is contacting the presentation board. This is similar to pressure sensing microswitch 122 of eraser 104.

Another method of identification of touching of the presentation board uses the following features of eraser 162. Eraser surface 168 has two contact microswitches 180 located substantially at each end of eraser surface 168, which are substantially similar in function to contact microswitch 64 of FIG. 6. If only one contact microswitch 180 senses contact with the presentation board, only a small area will be erased, such as a letter, for example. If, however, both contact microswitches 180 sense contact with the presentation board, a zone with the length and width of eraser surface 168 will be erased.

Similarly to eraser 104, eraser 162 also has transmitter device features. Specifically, eraser 162 has at least one, and preferably two, cylindrical ultrasound transmitters 182, located in handle 164, preferably substantially at each end of handle 164. Since each ultrasound transmitter 182 is located in handle 164, eraser 162 also features an ultrasound conductor tube 184 for each ultrasound transmitter 182. Each ultrasound conductor tube 184 goes from handle 164 to eraser element 166, such that the ultrasound signal from each ultrasound transmitter 182 is transmitted downward. Eraser 162 also has a reflector cone 186 for each ultrasound transmitter 182. Reflector cone 186 is preferably located in eraser element 166, reflecting the ultrasound waves in all directions.

Eraser 162 also has two infrared transmitters 188, located substantially at each end of handle 164. Each infrared transmitter 188 has an infrared reflector 190, also located in handle 164, which serves a similar function as reflector cone 186.

Figure 10:
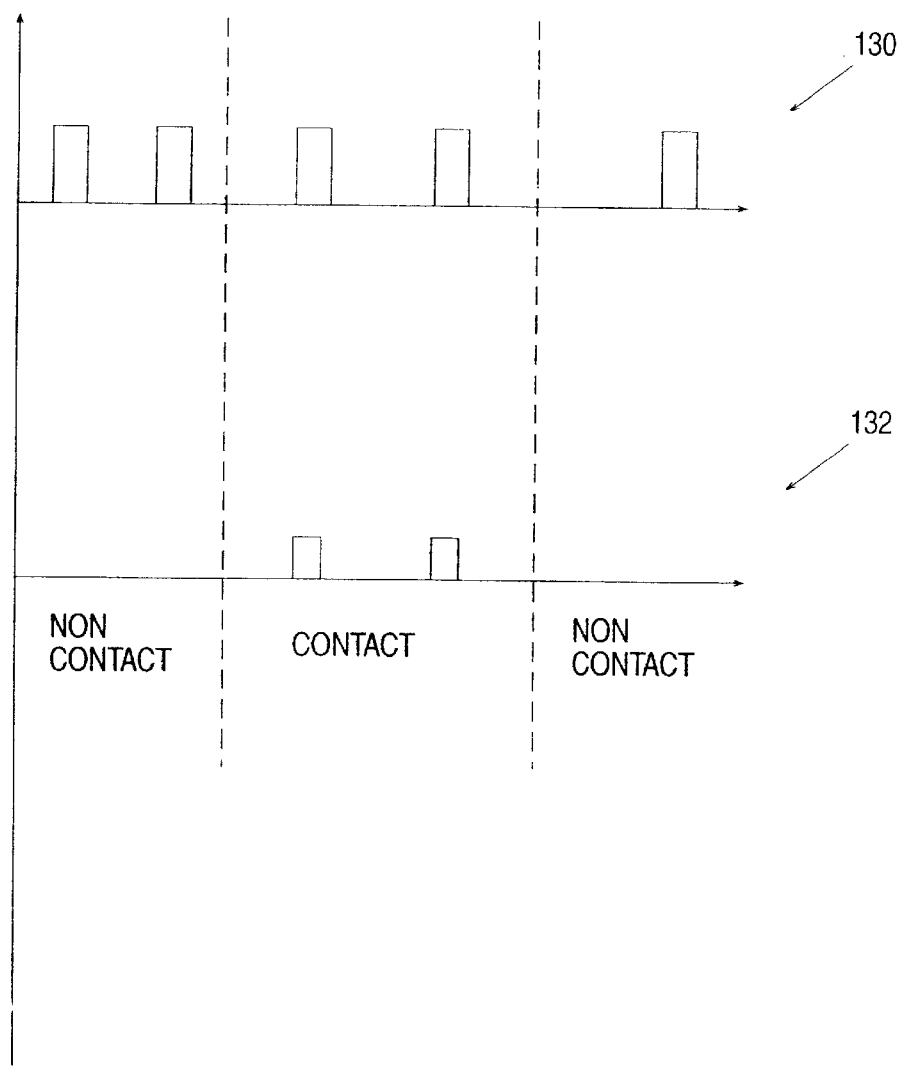
FIG. 10 illustrates the signals received by air-borne ultrasound receivers and a board-mounted transducer, respectively, according to another embodiment of the prior art presentation board digitizer system.

Turning now to FIG. 10, this shows the principle of operation of a further embodiment of a transmitter device for use with a presentation board digitizer system. This device is generally similar to transmitter device 40 described above except that it dispenses with microswitch 64, instead identifying pen-board contact by transmission of vibrations through the board.

As mentioned earlier, digitizer systems employing through-the-board transmission suffer from poor accuracy and dependency on specific board design. However, they have a major advantage of inherent pen-board contact identification. The prior art device described in context with this example combines this feature with all the advantages of precision and independence from board design provided by air-borne ultrasound systems, using the through-the-board detection solely for contact detection.

Thus, this embodiment may be used with a presentation board system essentially similar to that of FIG. 1, with the addition of a transducer associated with the board (not shown) for detecting vibrations from the transmitter conducted through the board. The processor of the receiver system is then responsive to outputs from the air-borne ultrasound receivers to calculate a current position of the transmitter, and to the output from the board mounted transducer to identify contact between the drawing implement and the board, thereby identifying operative strokes of the drawing implement.

The principle of this system is shown clearly in FIG. 10 in which plot 130 represents the signal from one of the ultrasound receiver assemblies and plot 132 represents the signal from the board-mounted transducer. Plot 130 shows a continuous sequence of pulses since the transmitters operate continuously as long as the pen is in use, according to this embodiment. Plot 132, on the other hand, only registers corresponding pulses during a period that the pen is in contact with the board. Although the signal quality of plot 132 is typically inferior, it is more than sufficient for identification of contact or non-contact conditions.

The principles and operation of a handheld device and digitizing system according to the present invention may be better understood with reference to drawings 14–21 and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The present invention provides several improvements to the above described prior art digitizing systems, which render such systems more accurate and/or more comfortable for use.

Figure 14:
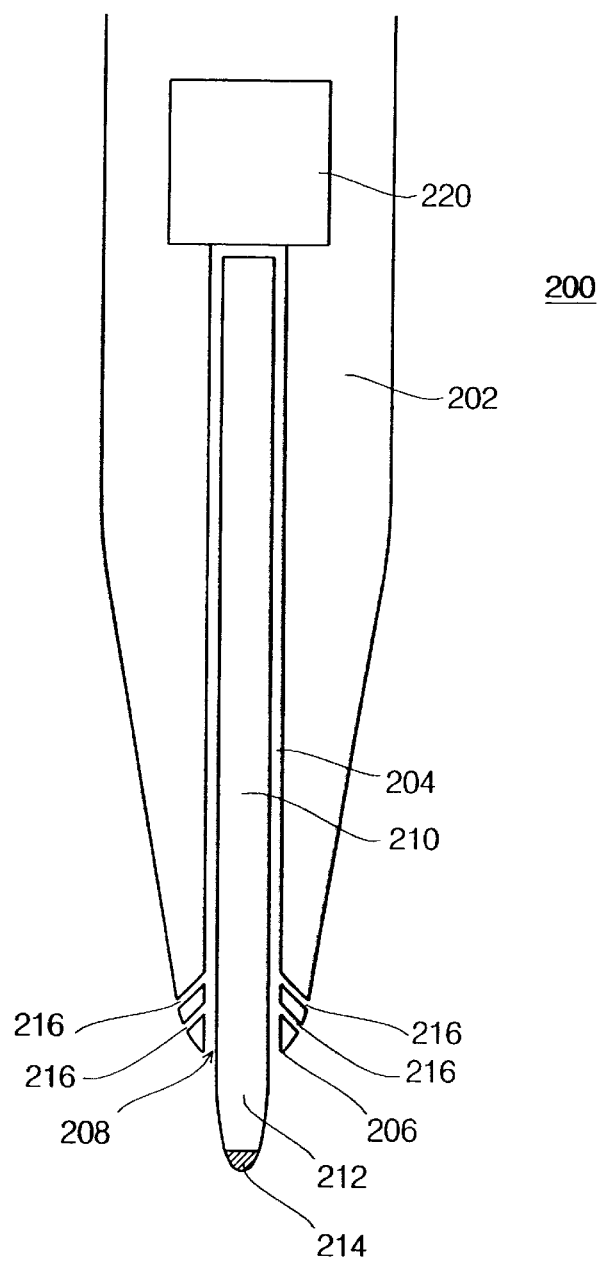
FIG. 14 is a cross sectional view of a distal portion of a handheld device according to one aspect of the present invention, having an ultrasonic receiver or transmitter device located remote from the drawing tip thereof, yet enables triangulation of the drawing tip itself.

Thus, according to one aspect, the present invention provides a handheld device for use with a board supplemented with a processing system for digitizing operative strokes of the handheld device on the board. The handheld device according to this aspect of the present invention is shown in FIG. 14 and is referred to hereinbelow as device 200.

Device 200 includes a housing 202. Housing 202 has a substantially cylindrical bore 204 therein. Bore 204 terminates at a distal end 206 of housing 202 with a central orifice 208 which communicates with bore 204. Housing 202 serves for receiving a portion of a body 210 of a drawing implement 212 with its drawing tip 214 extending from central orifice 208. Housing 202 is formed with a plurality of openings 216 which are circumferencly arranged at distal end 206 of housing 202 and communicating with bore 204.

Device 200 further includes an ultrasonic receiver or transmitter device 220, preferably a piezoelectric ultrasonic receiver or transmitter device. Device 220 is mounted within housing 202, remote from drawing tip 214, yet in close proximity with bore 204. Device 220 serves for receiving or transmitting an intermittent ultrasound signal through bore 204 and plurality of openings 216, thereby enabling triangulation of drawing tip 214 by compatible ultrasound receivers/transmitters located in an appropriate context with the board.

This aspect of the present invention has advantages over configurations in which the device born ultrasound receiver/transmitter is located close to the drawing tip and thickens a portion of a drawing implement which is traditionally narrow. The use of ultrasound tunneling through bore 204 and openings 216 (or vice versa) ensures accurate triangulation of the drawing tip although the handheld device born ultrasound receiver/transmitter is remote therefrom.

It will be appreciated by one ordinarily skilled in the art that other features of the prior art handheld devices described hereinabove and novel features of the handheld devices according to the various aspects of the present invention as further described herein can be combined to operate with device 200.

Figure 15:
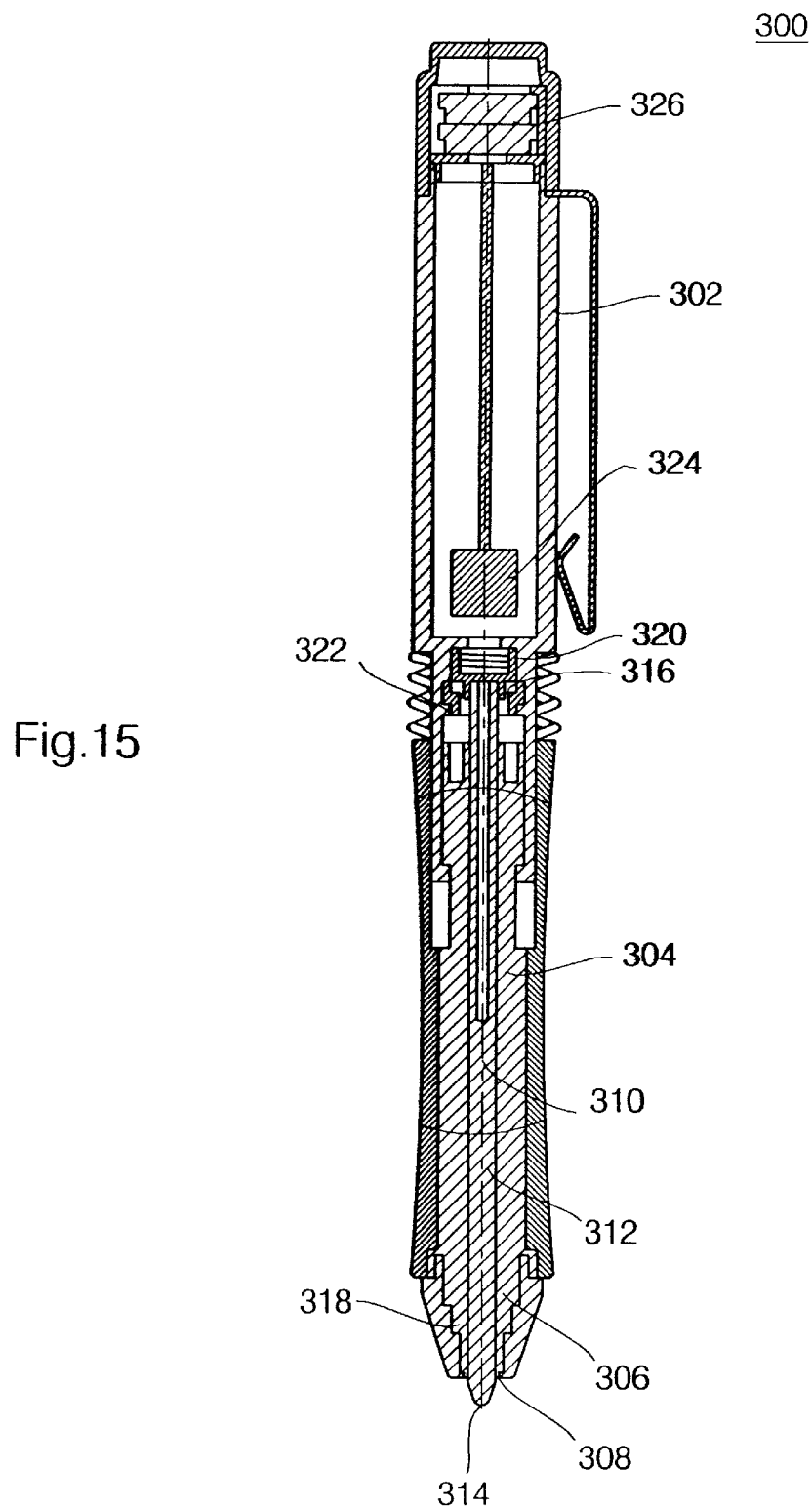
FIG. 15 is a cross sectional view of a handheld device according to another aspect of the present invention, having a retainer adapted at frontal replacement of an operative implement thereof and a microswitch actuatable by the operative implement.

According to another aspect, the present invention provides a handheld device for use with a board or screen supplemented with a processing system for digitizing operative strokes of the handheld device on the board or screen. The handheld device according to this aspect of the present invention is shown in FIG. 15 and is referred to hereinbelow as device 300.

Device 300 includes a housing 302. Housing 302 has a substantially cylindrical bore 304 therein, terminating at a distal end 306 of housing 302 with a central orifice 308 which communicates with bore 304. Housing 302 serves for receiving and releasing a portion of a body 310 of a removably attachable operative implement 312 through orifice 308 with its operative tip 314 extending from central orifice 308.

Thus, according to this aspect of the present invention front loading and replacement of operative implement 312 is enabled, to assist in maintaining the electronic components of device 300 undisturbed upon replacing implements 312 as required or desired. This, in turn, provides for constructional simplicity and cost-effectivity.

Device 300 further includes a retainer 316. Retainer 316 is engaged in housing 302 for releasably retaining removably attached operative implement 312 within housing 302.

Device 300 further includes an ultrasonic receiver or transmitter device 318, preferably a piezoelectric ultrasonic receiver or transmitter device. Device 318 is internally or externally (as shown) connected to housing 302 for receiving or transmitting an intermittent ultrasound signal. In the example shown device 318 has an annular configuration and is surrounding operative tip 314 of implement 312. It will, however, be appreciated that other constructions, in which, for example, device 318 is remotely engaged within housing 302, as described, for example, with respect to device 200 above, are also envisaged.

Device 300 further includes a microswitch 320 implemented within housing 302. Microswitch 320 is actuated when contacted by a proximal end 322 of body 310, so as to be responsive to a force exerted on operative tip 314 of operative implement 312. The construction and operation of microswitches are further described above with respect to prior art devices. These descriptions are incorporated herein to describe the construction and operation of microswitch 320.

Both, touch and pressure actuated microswitches are envisaged. While in the first case, all on none sensation is experienced, in the latter case sensation of a continuous variable is optional. In this case, the pressure information can encode data relating, for example, to different operative implements employed.

In any case, the information sensed by microswitch 320 is typically forwarded to the digitizing system via a dedicated communication line, e.g., an infrared communication line. However, other possibilities are further described hereinunder with respect to additional aspects of the present invention are envisaged.

Device 300 further includes an electronic circuitry 324. Circuitry 324 is engaged within housing 302 and electronically communicates with microswitch 320 for affecting operation of device 300 at least when microswitch 320 indicates that force is exerted on operative tip 314 of operative implement 312.

A power source 326 (e.g., a pair of batteries) serves to provide device 318 and microswitch 320 with power for operation.

Operative implement according to this and other aspects of the present invention can be, for example, a drawing implement, an annotation implement or an eraser.

It will be appreciated by one ordinarily skilled in the art that other features of the prior art handheld devices described hereinabove and novel features of the handheld devices according to the various aspects of the present invention as further described herein can be combined to operate with device 300.

Figure 16:
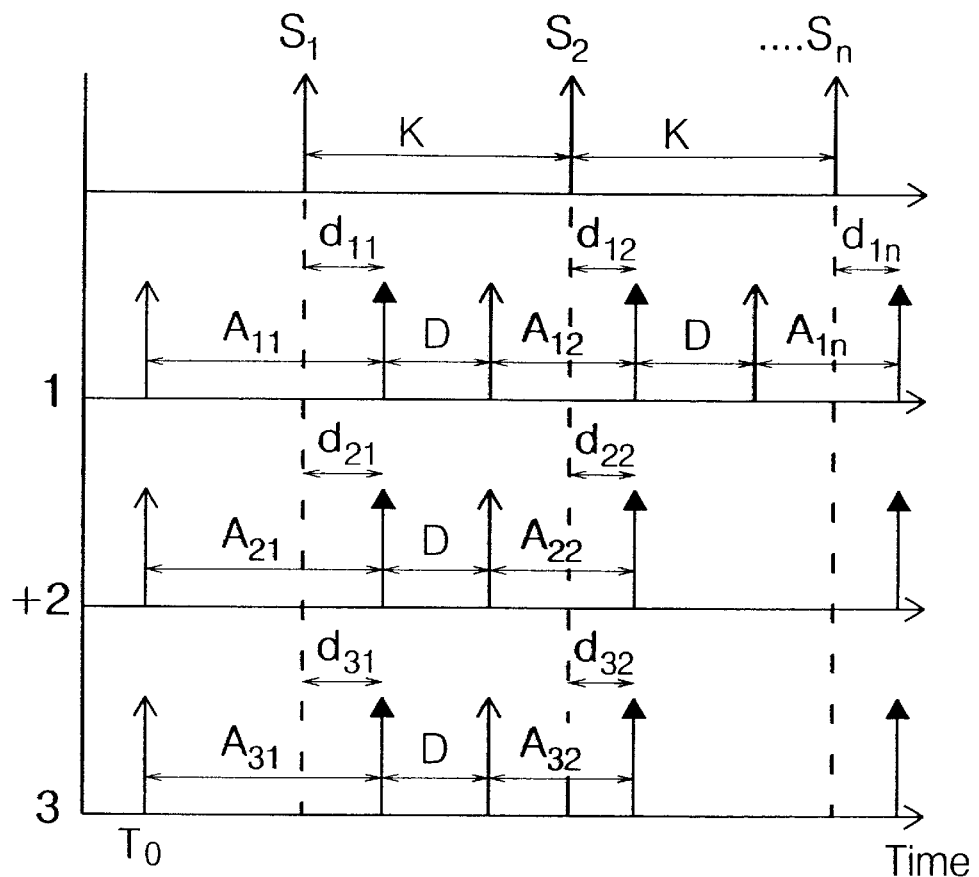
FIG. 16 is a graphical depiction demonstrating the operation of a method according to yet another aspect of the present invention, which method is directed at improving the signal-to-noise ratio.

As shown in FIG. 16, according to still another aspect of the present invention there is provided a method operative in a board or screen digitizing system including at least three spaced apart ultrasound receivers associated with the board or screen surface, and a handheld device including an intermittent signal transmitter (e.g., using frequencies of 40–100 kHz while transmitting a signal). The method serves for collecting ultrasound signals from the handheld device and for tracking the movement of the handheld device with respect to the board.

Assume that the time interval between adjacent ultrasonic signals $S_1 \ldots S_n$, generated by the handheld device is substantially constant and equals K. At an arbitrary time point, $T_0$, each of the three ultrasound receivers, CH1, CH2 and CH3, is turned on so as to receive the first signal $S_1$. The time of that reception for each of the receivers, $A_{11}$, $A_{21}$ and $A_{31}$, depends on the distance between each of the receivers and the handheld device at the time of transmission, so as the time between the actual transmittance of the first signal $S_1$ and the delayed time of reception, $d_{11}$, $d_{2l}$, $d_{31}$, thereof, for each of the receivers. The time between adjacent signal receptions for each of the receivers depends on the movement and therefore change of position of the handheld device relative to each of the receivers. This time is shown in FIG. 16 to include a constant D, which is selected shorter (e.g., about 20–60% shorter) than K and a position dependent interval, $A_{11}$, $A_{12}$, $\ldots A_{1n}$; $A_{21}$, $A_{22} \ldots A_{2n}$; and $A_{31}$, $A_{32} \ldots A_{3n}$. The time interval between the actual transmittance of the signals and their reception for each of the receivers is represented by $d_{11}$, $d_{12}$, $\ldots d_{1n}$; $d_{21}$, $d_{22} \ldots d_{2n}$; and $d_{31}$, $d_{32} \ldots d_{3n}$. As already mentioned, D is a constant and defines a time period following the reception of a signal by any of the receivers. Since D is selected shorter than K, it is anticipated that during D, no signal is expected to arrive at any of the receivers and therefore, signal collection thereby can be shut down or disregarded for the D time period. This, in turn, reduces the background signals collected by each of the receivers and improves the signal to noise ration of the system.

Thus, in order for the system to track the position of the handheld device, in a signal timing free manner, the following steps are undertaken.

First, the handheld device is selected to transmit signals of a predetermined frequency, the time interval therebetween equals K.

Second, an arbitrary time point for signal collection, $T_0$, in which each of the receivers is switched on, is set.

Third, for each of the receivers the system calculates the time elapsed between the actual transmission and actual reception of a signal. For example, the time elapsed between the actual transmission and actual reception of the second signal by the first receiver is calculated as follows:

$$d_{12}=D+A_{12}-K+d_{11}$$

This calculation is repeated for each of the receivers and each of the signals.

However, $d_{11}$ is unknown. In order to calculate $d_{11}$, $d_{21}$ and $d_{31}$ the system employs two pairs of the three receivers, say CH1–CH2 and CH1–CH3 or CH2–CH3, and calculates, for each of the two pairs the time difference in reception of signals $S_1$ to $S_n$. It will be appreciated that such differences, for each pair of receivers, are represented by a hyperbolic plot. It will further be appreciated that the intersection between the two hyperbolic plots represents the coordinates of the handheld device at time of first transmission, $S_1$, from which $d_{11}$, $d_{21}$ and $d_{3l}$ can be calculated.

Thus, using the method herein described, one can follow the location of the handheld device by (i) calculating its position when transmitting a first signal and further by (ii) calculating the change in its position thereafter, when transmitting subsequent signals.

In order to further substantiate the results, some corrections are preferably undertaken.

Data pertaining to the first m points (m typically ranges between 20 and 100, preferably about 50) is collected. Each data point is calculated first as described above using the differences between pairs of receivers to calculate the first data point and thereafter the m-1 data points that follows, and second by considering each data point as a reference to the following data point. Then averaging for m data points is undertaken to substantiate the results.

Additional averaging process taking into account the rational speed of the handheld device with respect to the board or screen and the continuity of the hand holding the device when sketching or writing thereon, can be effected to further substantiate the results.

It will be appreciated that K is not always a constant since the frequency of signals depend on the specific piezoelectric crystal employed and to some extent environmental factors, such as humidity and temperature. Since all of the above calculations depend on the value of K, the actual K pertaining to the system at a given time should be calculated.

In order to calculate the actual K value at a given time of operation, the following equation is employed:

$$K=D+A_{12}-d_{12}+d_{11}$$

$d_{12}$ and $d_{11}$ are calculated as described above, whereas K is recalculated for every signal by:

$$K_j = \frac{(j-1)K_{j-1} + K_j}{j}$$

wherein j is the last signal sampled, say the thousandth signal. K is thus calculated for every signal and averaged.

Thus, according to this aspect of the present invention a plurality of time non-referenced ultrasound signals are collected by each one of at least three spaced apart ultrasound receivers and the position of the handheld device is calculated for each of the time non-referenced ultrasound signals, thereby enabling to track the handheld device, while obviating the need for an infrared link for referencing the time of each of the signals, which link is known to be a high energy consumer.

As mentioned hereinabove, the length of the D interval as compared to the K interval is selected so as to ensure picking-up of each of the actual signals transmitted by the transmitter, to thereby provide much higher signal-to-noise ratio and track more accurately the operative tip of the handheld device.

It will be appreciated by one ordinarily skilled in the art that other features of the prior art handheld devices described hereinabove and novel features of the handheld devices according to the various aspects of the present invention as further described herein can be combined to operate with the method herein described.

Figure 17:
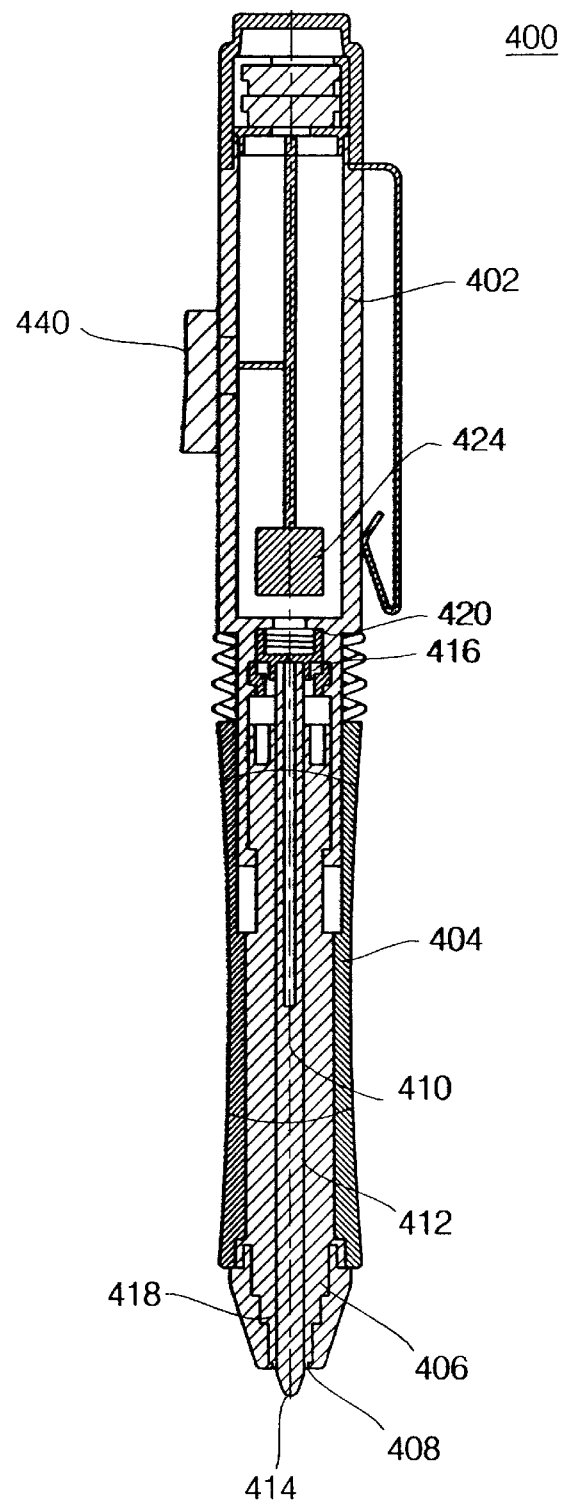
FIG. 17 is a cross sectional view of a handheld device according to still another aspect of the present invention, having a retainer adapted at replacement of an operative implement thereof and a controller for controlling the frequency of an ultrasound transmitter therein, as an indication of a change of the operative implement.

According to yet another aspect, the present invention provides a handheld device for use with a board or screen supplemented with a processing system for digitizing operative strokes of the handheld device on the board or screen. The handheld device according to this aspect of the present invention is shown in FIG. 17 and is referred to hereinbelow as device 400.

Device 400 includes a housing 402. Housing 402 has a substantially cylindrical bore 404 therein. Bore 404 terminates at a distal end 406 of housing 402 with a central orifice 408 communicating with bore 404. Housing 402 serves for receiving and releasing a portion of a body 410 of a removably attachable operative implement 412 through orifice 408, with its operative tip 414 extending from central orifice 408. Operative implement 412 is selectable among a plurality of different operative implements, including, but not limited to, drawing implements, e.g., of different colors, eraser implements and annotation implements.

Device 400 further includes a retainer 416. Retainer 416 is engaged within housing 402 and serves for releasably retaining removably attached operative implement 412 within housing 402.

Device 400 further includes an ultrasonic transmitter device 418. Device 418 is internally, or as shown, externally, connected to housing 402 for transmitting one of a plurality of intermittent ultrasound signals. Each of the plurality of intermittent ultrasound signals according to this aspect of the present invention has a somewhat different frequency, say in the range of 40–100 kHz, wherein each of the frequencies employed is associated with one of the plurality of different operative implements 412 applicable for use with device 400.

Device 400 according to this aspect of the present invention further includes a controller 440 being on or in housing 402 for setting transmitter device 418 to transmit an intermittent ultrasound signal of a frequency corroborating with one of the plurality of different operative implements 412.

Thus, according to this aspect of the present invention the digitized system is made aware of the operative implement employed at a given time and responds accordingly. It will be appreciated that controller 440 can be integrated with the different operative implements 412, such that insertion of one of implements 412 into housing 402, directly results in automatic identification of the inserted implement 412. Alternatively, and as specifically shown in FIG. 17, a user interface is employed as part of controller 440. It will further be appreciated, as further detailed hereinunder, that controller 440 can be remotely controlled by means of remote control communication.

It will be appreciated by one ordinarily skilled in the art that other features of the prior art handheld devices described hereinabove and novel features of the handheld devices according to the various aspects of the present invention as further described herein can be combined to operate with device 400.

Figure 18:
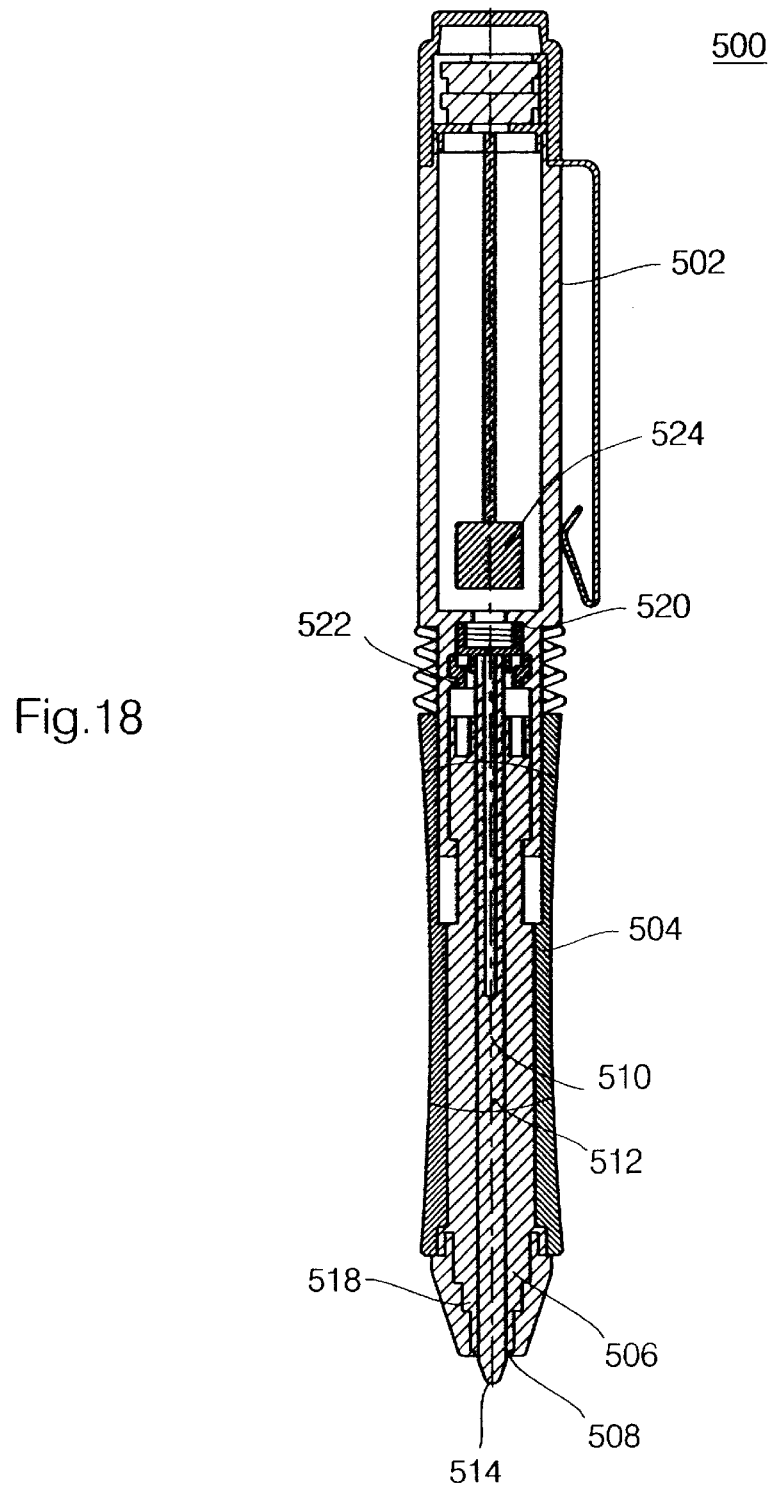
FIG. 18 is a cross sectional view of a handheld device according to yet another aspect of the present invention capable of transmitting frequency encoded ultrasonic information.

According to still another aspect, the present invention provides a handheld device for use with a board or screen supplemented with a processing system for digitizing operative strokes of the handheld device on the board or screen. The handheld device according to this aspect of the present invention is shown in FIG. 18 and is referred to hereinbelow as device 500.

Device 500 includes a housing 502. Housing 502 has a substantially cylindrical bore 504 therein. Bore 504 terminates at a distal end 506 of housing 502 with a central orifice 508 which communicates with bore 504. Housing 502 serves for receiving therein a portion of a body 510 of an operative implement 512, with its operative tip 514 extending from central orifice 508.

Device 500 further includes an ultrasonic transmitter device 518. Device 518 is internally or externally connected to housing 502 for transmitting one of two intermittent ultrasound signals. Each of the two intermittent ultrasound signals has a somewhat different frequency, say in the range of 40–100 kHz.

Device 500 further includes a microswitch 520 engaged within housing 502. Microswitch 520 can acquire a first mode or a second mode of operation. Microswitch 520 acquires the first mode of operation when it is in contact with a proximal end 522 of body 510 and the second mode of operation when it is not in contact with proximal end 522 of body 510. Microswitch 520 can be, for example, a touch or pressure sensitive microswitch.

Device 500 further includes an electronic circuitry 524. Circuitry 524 electronically communicates between microswitch 520 and transmitter device 518. Electronic circuitry 524 serves for associating one of the first and the second modes of operation of microswitch 520 with transmitter device 518, such that intermittent ultrasound signals of different frequency are transmitted by transmitting device 518 in a mode dependent manner, thereby informing the processing system whether operative tip 514 is in contact with, or removed from, the board or screen.

The use of frequency encoded information obviated the need for a separate line of communication, such as infrared communication, to forward such information to the digitizing system. This, in turn, saves battery power.

It will be appreciated by one ordinarily skilled in the art that other features of the prior art handheld devices described hereinabove and novel features of the handheld devices according to the various aspects of the present invention as further described herein can be combined to operate with device 500.

Figure 19:
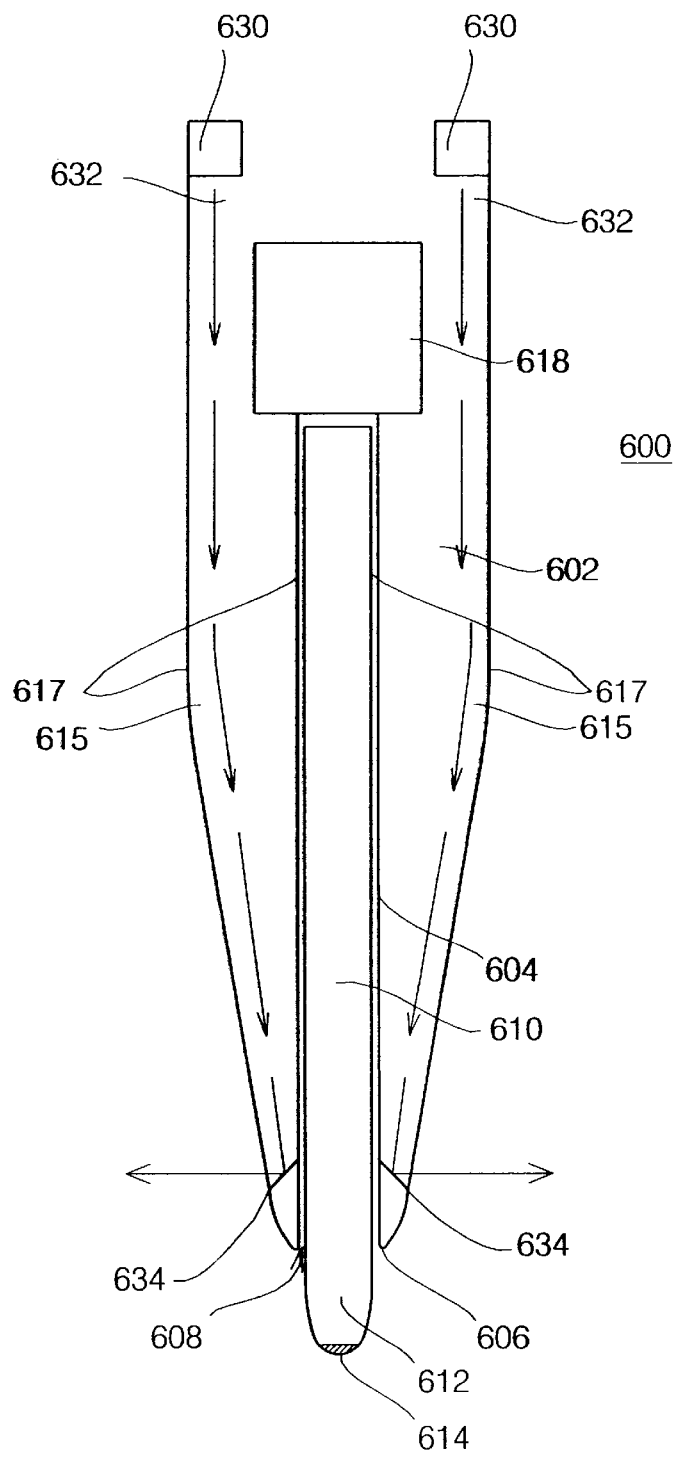
FIG. 19 is a cross sectional view of a distal portion of a handheld device according to a further aspect of the present invention, having an infrared link directed through the housing thereof.

According to yet another aspect, the present invention provides a handheld device for use with a board or screen supplemented with a processing system for digitizing operative strokes of the handheld device on the board or screen. The handheld device according to this aspect of the present invention is shown in FIG. 19 and is referred to hereinbelow as device 600.

Device 600 includes a housing 602. Housing 602 has a substantially cylindrical bore 604 therein. Bore 604 terminates at a distal end 606 of housing 602 with a central orifice 608 which communicates with bore 604. Housing 602 serves for receiving a portion of a body 610 of an operative implement 612 with its operative tip 614 extending from central orifice 608.

At least a longitudinal portion 615 of housing 602, originating at distal end 606 of housing 602, and preferably terminating at a proximal end of housing 602, is made of an infrared conveying material. According to a preferred embodiment all of housing 602 is made of the infrared conveying material and is coated by an infrared reflecting coat 617, which preferably also coats bore 604. Examples of infrared conveying materials suitable for housing 602 include, but are not limited to, lexan, which can be made to include pigments which renders it opaque.

Device 600 further includes an ultrasonic receiver or transmitter device 618. Device 618 is internally or externally connected to housing 602 and serves for receiving or transmitting an intermittent ultrasound signal.

Device 600 further includes at least one infrared transmitter device 630. Device 630 is implemented at a proximal end 632 of longitudinal portion 615 of housing 602. Infrared transmitter device 630 is designed for directing infrared radiation emitted thereby through longitudinal portion 615 of housing 602. At a distal end thereof, portion 615 includes at least one infrared reflector 634 to reflect the infrared radiation out of housing 602.

Thus, according to this aspect of the present invention the infrared transmitter can be located at a position which is remote from the operative tip, which is traditionally the narrowest region of the device, say the proximal end or medial portion of the device, which is, in many cases, shielded by the hand of the user and under such conditions becomes inoperative.

It will be appreciated by one ordinarily skilled in the art that other features of the prior art handheld devices described hereinabove and novel features of the handheld devices according to the various aspects of the present invention as further described herein can be combined to operate with device 600.

Figure 20:
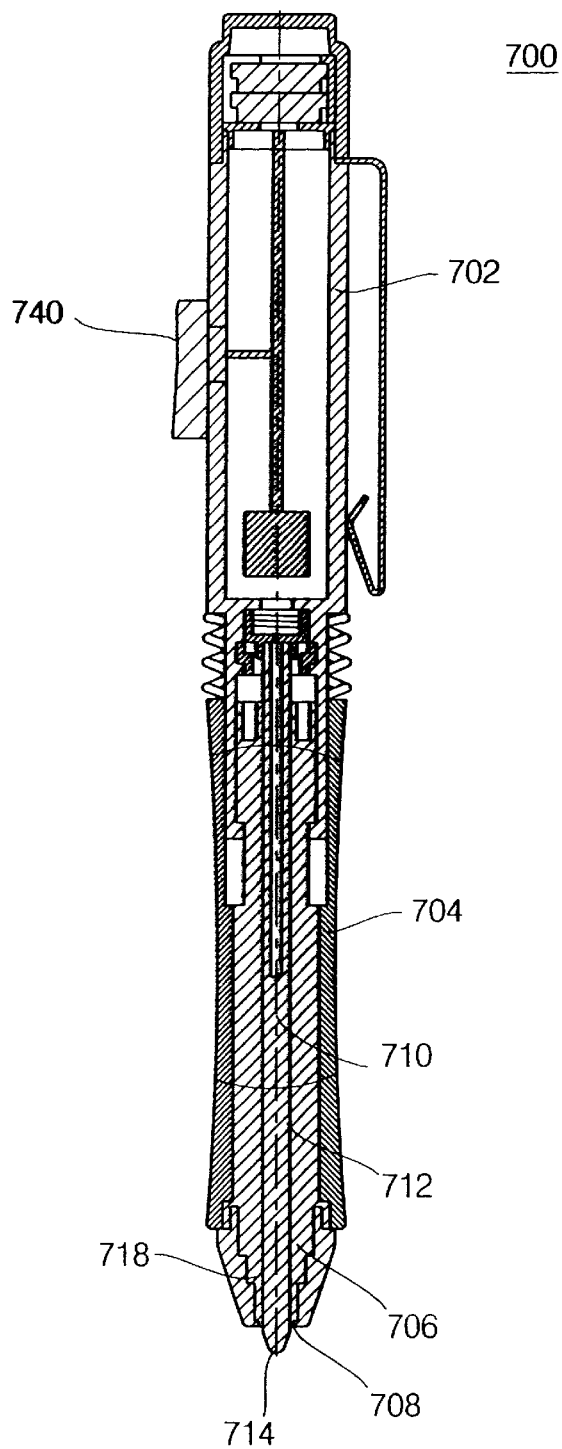
FIG. 20 is a cross sectional view of a remote controlled handheld device according to still a further aspect of the present invention capable of receiving operational commands via remote control communication line.

According to another aspect, the present invention provides a remotely controlled handheld device for use with a board or screen supplemented with a processing system for digitizing operative strokes of the handheld device on the board or screen. The handheld device according to this aspect of the present invention is shown in FIG. 20 and is referred to hereinbelow as device 700.

Device 700 includes a housing 702. Housing 702 has a substantially cylindrical bore 704 therein, Bore 704 terminates at a distal end 706 of housing 702 with a central orifice 708 which communicates with bore 704. Housing 702 serves for receiving a portion of a body 710 of an operative implement 712 with its operative tip 714 extending from central orifice 708.

Device 700 further includes an ultrasonic receiver or transmitter device 718. Device 718 is internally or externally connected to housing 702 and serves for receiving or transmitting an intermittent ultrasound signal.

Device 700 further includes a remote signal receiver 740 for receiving operational command signals from a remote signal transmitter (remote control) which is controlled by an operator. Operational commands according to this aspect of the present invention, include 'on' and 'off' commands, operative implement change commands, etc.

It will be appreciated by one ordinarily skilled in the art that other features of the prior art handheld devices described hereinabove and novel features of the handheld devices according to the various aspects of the present invention as further described herein can be combined to operate with device 700.

Figure 21:
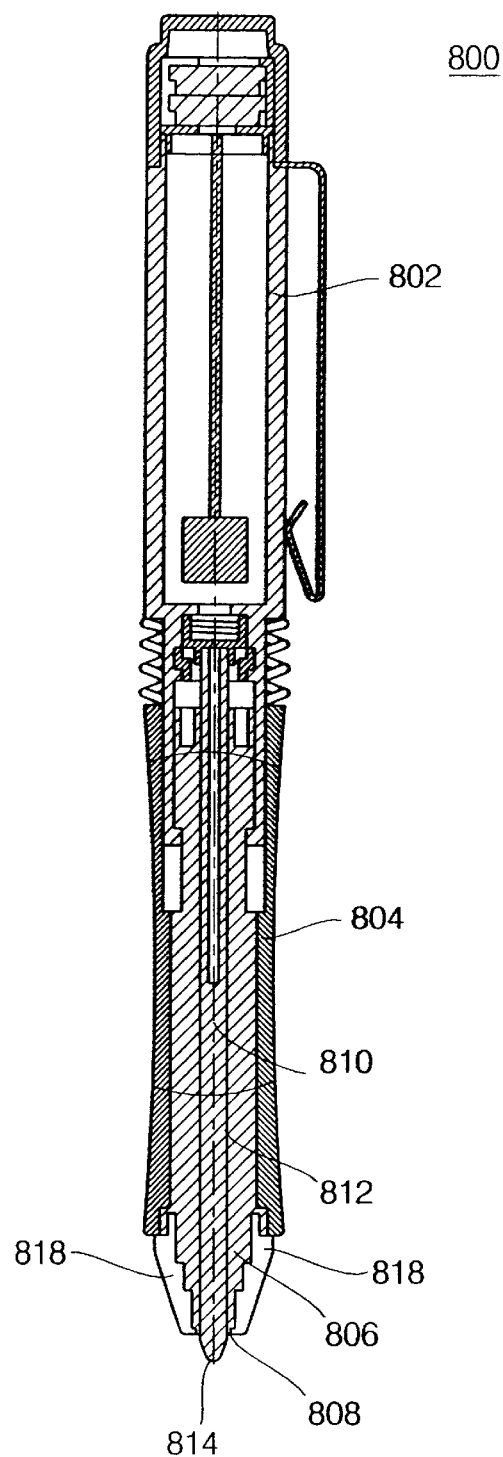
FIG. 21 is a cross sectional view of a handheld device according to yet a further aspect of the present invention having a transparent ultrasonic device surrounding the operative tip of the operative implements thereof.

According to still another aspect, the present invention provides a handheld device for use with a board or screen supplemented with a processing system for digitizing operative strokes of the handheld device on the board or screen. The handheld device according to this aspect of the present invention is shown in FIG. 21 and is referred to hereinbelow as device 800.

Device 800 includes a housing 802. Housing 802 has a substantially cylindrical bore 804 therein. Bore 804 terminates at a distal end 806 of housing 802 with a central orifice 808 which communicates with bore 804. Housing 802 serves for receiving a portion of a body 810 of an operative implement 812 with its operative tip 814 extending from central orifice 808.

Device 800 further includes a transparent ultrasonic receiver or transmitter device 818. Device 818 is connected to housing and surrounds operative tip 814 for receiving or transmitting an intermittent ultrasound signal, thereby rendering operative tip 814 visible to a user. Transparent piezoelectric polymers are known in the art. Examples include PVdF, PVF2 and P(VF2–VF3) copolymer.

It will be appreciated that this feature of device 800 is of great importance. The most straight forward location for locating device 818 is at or close to operative tip 814 because the operative tip is to be tracked by sequential triangulation. However, when using an operative implement, such as a drawing or annotation implement, a user is in many cases accustomed at viewing the operative tip thereof. This habit is hampered in prior art devices by the ultrasonic device implemented thereat. Providing a transparent device overcomes this limitation.

It will be appreciated by one ordinarily skilled in the art that other features of the prior art handheld devices described hereinabove and novel features of the handheld devices according to the various aspects of the present invention as further described herein can be combined to operate with device 800.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A handheld device for use with a board supplemented with a processing system for digitizing operative strokes of the handheld device on the board, the handheld device comprising:

(a) a housing having a substantially cylindrical bore therein terminating at a distal end of said housing with a central orifice communicating with said bore, said housing receiving a portion of a body of a drawing implement with its drawing tip extending from said central orifice, said housing being formed with a plurality of openings being circumferencly arranged at said distal end of said housing and communicating with said bore; and (b) an ultrasonic receiver or transmitter device mounted within said housing, remote from said drawing tip, yet in close proximity with said bore, said device being for receiving or transmitting an intermittent ultrasound signal through said bore and said plurality of openings, thereby enabling triangulation of said drawing tip.

2. A handheld device for use with a board supplemented with a processing system for digitizing operative strokes of the handheld device on the board, the handheld device comprising:

(a) a housing having a substantially cylindrical bore therein terminating at a distal end of said housing with a central orifice communicating with said bore, said housing receiving and releasing a portion of a body of a removably attachable drawing implement through said orifice with its drawing tip extending from said central orifice;

(b) a retainer in said housing for releasably retaining said removably attached drawing implement within said housing;

(c) an ultrasonic receiver or transmitter device being connected to said housing for receiving or transmitting an intermittent ultrasound signal;

(d) a microswitch in said housing being actuated when contacted by a proximal end of said body, so as to be responsive to a force exerted on said drawing tip of said drawing implement; and (e) an electronic circuitry being in said housing and electronically communicating with said microswitch for affecting operation of said device at least when said microswitch indicates that said force is exerted on said drawing tip of said drawing implement.

3. A handheld device for use with a board or screen supplemented with a processing system for digitizing operative strokes of the handheld device on the board or screen, the handheld device comprising:

(a) a housing having a substantially cylindrical bore therein terminating at a distal end of said housing with a central orifice communicating with said bore, said housing receiving and releasing a portion of a body of a removably attachable operative implement through said orifice with its operative tip extending from said central orifice, said operative implement being selected from the group consisting of a drawing implement and an annotation implement;

(b) a retainer in said housing for releasably retaining said removably attached operative implement within said housing; and (c) an ultrasonic receiver or transmitter device being connected to said housing for receiving or transmitting an intermittent ultrasound signal.

4. In a board or screen digitizing system including at least three spaced apart ultrasound receivers associated with the board or screen surface, and a handheld device including an intermittent signal transmitter, a method of tracking the handheld device, the signals being transmitted with a preset first interval therebetween, the method comprising the steps of collecting a plurality of time non-referenced ultrasound signals by each of the at least three spaced apart ultrasound receivers and calculating a position of the handheld device for each of the time non-referenced ultrasound signals, thereby tracking the handheld device.

5. The method of claim 4, wherein reception of each of said at least three spaced apart ultrasound receivers is suspended for a second time interval following the reception of a signal thereby, said second time interval is shorter than said first time interval.

6. A handheld device for use with a board or screen supplemented with a processing system for digitizing operative strokes of the handheld device on the board or screen, the handheld device comprising:

(a) a housing having a substantially cylindrical bore therein terminating at a distal end of said housing with a central orifice communicating with said bore, said housing receiving and releasing a portion of a body of a removably attachable operative implement through said orifice with its operative tip extending from said central orifice and being selectable among a plurality of different operative implements;

(b) a retainer in said housing for releasably retaining said removably attached operative implement within said housing; and (c) an ultrasonic transmitter device being connected to said housing for transmitting one of a plurality of intermittent ultrasound signals, each of said plurality of intermittent ultrasound signals having a different frequency, each of said frequencies being associated with one of said plurality of different operative implements; and (d) a controller on or in said housing for setting said transmitter device to transmit an intermittent ultrasound signal of a frequency corroborating with one of said plurality of different operative implements.

7. A handheld device for use with a board or screen supplemented with a processing system for digitizing operative strokes of the handheld device on the board or screen, the handheld device comprising:

(a) a housing having a substantially cylindrical bore therein terminating at a distal end of said housing with a central orifice communicating with said bore, said housing receiving a portion of a body of an operative implement with its operative tip extending from said central orifice;

(b) an ultrasonic transmitter device being connected to said housing for transmitting one of two intermittent ultrasound signals, each of said two intermittent ultrasound signals having a different frequency;

(c) a microswitch in said housing being in a first mode or a second mode, said microswitch being in said first mode when in contact with a proximal end of said body and in said second mode when not in contact with said proximal end of said body; and (d) an electronic circuitry electronically communicating between said microswitch and said transmitter device, said electronic circuitry being for associating one of said first and second modes with said transmitter device, such that said intermittent ultrasound signals of said different frequency are transmitted by said transmitting device in a mode dependent manner, thereby informing the processing system whether said operative tip is in contact with, or removed from, the board or screen.

8. A handheld device for use with a board or screen supplemented with a processing system for digitizing operative strokes of the handheld device on the board or screen, the handheld device comprising:

(a) a housing having a substantially cylindrical bore therein terminating at a distal end of said housing with a central orifice communicating with said bore, said housing receiving a portion of a body of an operative implement with its operative tip extending from said central orifice, at least a longitudinal portion of said housing originating at said distal end of said housing being of an infrared conveying material;

(b) an ultrasonic receiver or transmitter device being connected to said housing for receiving or transmitting an intermittent ultrasound signal;

(c) an infrared transmitter device being implemented at a proximal end of said longitudinal portion of said housing, said infrared transmitter device being designed for directing infrared radiation emitted thereby through said longitudinal portion of said housing.

9. The handheld device of claim 8, wherein said longitudinal portion of said housing is supplemented with an infrared reflector for reflecting said infrared radiation out of said housing.

10. A handheld device for use with a board or screen supplemented with a processing system for digitizing operative strokes of the handheld device on the board or screen, the handheld device comprising:

(a) a housing having a substantially cylindrical bore therein terminating at a distal end of said housing with a central orifice communicating with said bore, said housing receiving a portion of a body of an operative implement with its operative tip extending from said central orifice;

(b) an ultrasonic receiver or transmitter device being connected to said housing for receiving or transmitting an intermittent ultrasound signal;

(c) a pressure sensitive microswitch in said housing being actuated when pressured by a proximal end of said body, so as to be responsive to a force exerted on said drawing tip of said drawing implement; and (d) an electronic circuitry being in said housing and electronically communicating with said microswitch for affecting operation of said device at least when said microswitch indicates that said force is exerted on said drawing tip of said drawing implement.

11. A remotely controlled handheld device for use with a board or screen supplemented with a processing system for digitizing operative strokes of the handheld device on the board or screen, the handheld device comprising:

(a) a housing having a substantially cylindrical bore therein terminating at a distal end of said housing with a central orifice communicating with said bore, said housing receiving a portion of a body of an operative implement with its operative tip extending from said central orifice;

(b) an ultrasonic receiver or transmitter device being connected to said housing for receiving or transmitting an intermittent ultrasound signal; and (c) a remote signal receiver for receiving operational command signals from a remote signal transmitter being controlled by an operator.

12. A handheld device for use with a board or screen supplemented with a processing system for digitizing operative strokes of the handheld device on the board or screen, the handheld device comprising:

(a) a housing having a substantially cylindrical bore therein terminating at a distal end of said housing with a central orifice communicating with said bore, said housing receiving a portion of a body of an operative implement with its operative tip extending from said central orifice;

(b) a transparent ultrasonic receiver or transmitter device being connected to said housing and surrounding said operative tip for receiving or transmitting an intermittent ultrasound signal, thereby rendering said operative tip visible to a user.

* * * * *